United States Patent
Arai

(10) Patent No.: US 9,140,882 B2
(45) Date of Patent: Sep. 22, 2015

(54) ZOOM LENS, OPTICAL APPARATUS, AND METHOD FOR MANUFACTURING THE ZOOM LENS

(71) Applicant: Nikon Corporation, Chiyoda-ku, Tokyo (JP)

(72) Inventor: Daisaku Arai, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 14/341,427

(22) Filed: Jul. 25, 2014

(65) Prior Publication Data

US 2014/0334012 A1    Nov. 13, 2014

Related U.S. Application Data

(63) Continuation of application No. PCT/JP2013/000201, filed on Jan. 17, 2013.

(30) Foreign Application Priority Data

Jan. 25, 2012  (JP) ................. 2012-013565

(51) Int. Cl.
G02B 15/14    (2006.01)
G02B 15/16    (2006.01)
G02B 15/173   (2006.01)

(52) U.S. Cl.
CPC ............. G02B 15/16 (2013.01); G02B 15/173 (2013.01)

(58) Field of Classification Search
CPC .... G02B 15/173; G02B 27/646; G02B 15/14; G02B 13/009; G02B 9/34; G02B 15/20
USPC ......................... 359/676, 683, 687
See application file for complete search history.

(56) References Cited

U.S. PATENT DOCUMENTS

| | | | |
|---|---|---|---|
| 5,886,828 A * | 3/1999 | Kim | ................. 359/687 |
| 6,282,032 B1 | 8/2001 | Tomita | |
| 6,633,437 B1 | 10/2003 | Hoshi et al. | |
| 2006/0291071 A1 | 12/2006 | Ohtake | |
| 2009/0040624 A1 | 2/2009 | Shinohara | |
| 2009/0109548 A1 | 4/2009 | Kimura | |
| 2009/0290216 A1 | 11/2009 | Fujisaki | |
| 2009/0310228 A1 | 12/2009 | Shinohara | |
| 2010/0246025 A1 | 9/2010 | Saito et al. | |

(Continued)

FOREIGN PATENT DOCUMENTS

| EP | 2278374 A1 | 1/2000 |
|---|---|---|
| EP | 0994372 A1 | 4/2000 |

(Continued)

OTHER PUBLICATIONS

International Search Report from International Patent Application No. PCT/JP2013/000201, Apr. 16, 2013.

*Primary Examiner* — Scott J Sugarman
(74) *Attorney, Agent, or Firm* — Miles & Stockbridge P.C.

(57) ABSTRACT

A zoom lens including, in order from an object: a first lens group having positive refractive power; a second lens group having negative refractive power; a third lens group having positive refractive power; and a fourth lens group having positive refractive power, wherein when f2 denotes a focal length of the second lens group, and
fw denotes a focal length of the zoom lens in the wide-angle end state, the following conditional expression being satisfied:

$$1.90 < (-f2)/fw < 3.00.$$

28 Claims, 27 Drawing Sheets

(56) References Cited

U.S. PATENT DOCUMENTS

| | | |
|---|---|---|
| 2011/0026134 A1 | 2/2011 | Sakai |
| 2011/0134541 A1 | 6/2011 | Fujisaki |
| 2011/0273774 A1 | 11/2011 | Saruwatari |
| 2012/0013995 A1 | 1/2012 | Saruwatari |
| 2012/0099209 A1* | 4/2012 | Huang et al. .................. 359/687 |

FOREIGN PATENT DOCUMENTS

| | | |
|---|---|---|
| EP | 1736814 A1 | 12/2006 |
| JP | 06-59191 A | 3/1994 |
| JP | 2000-121939 A | 4/2000 |
| JP | 2001-188170 A | 7/2001 |
| JP | 2002-098893 A | 4/2002 |
| JP | 2007-003776 A | 1/2007 |
| JP | 2007-178846 A | 7/2007 |
| JP | 2009-042269 A | 2/2009 |
| JP | 2009-282439 A | 3/2009 |
| JP | 2009-109630 A | 5/2009 |
| JP | 2010-160242 A | 7/2010 |
| JP | 2010-160243 A | 7/2010 |
| JP | 2010-237455 A | 10/2010 |
| JP | 2011-033867 A | 2/2011 |

* cited by examiner

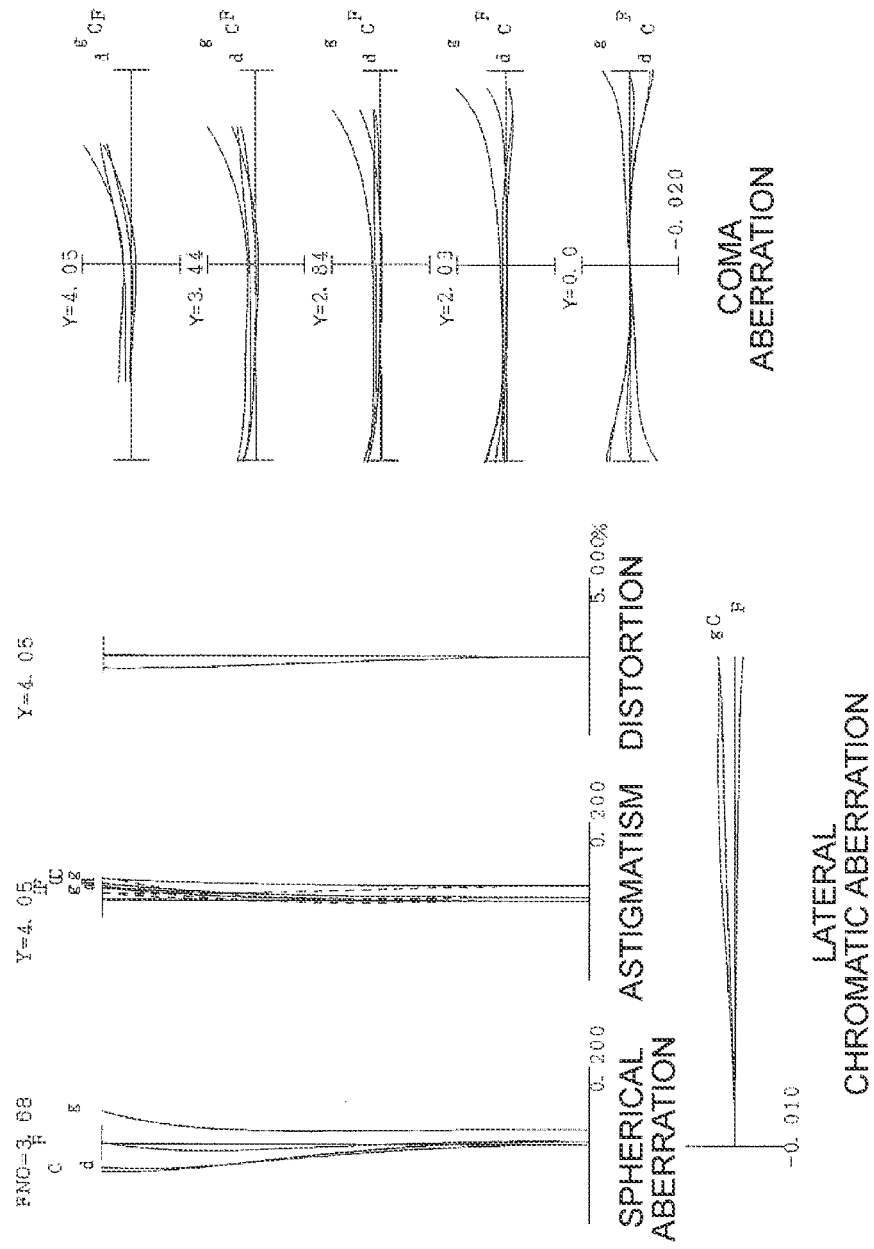

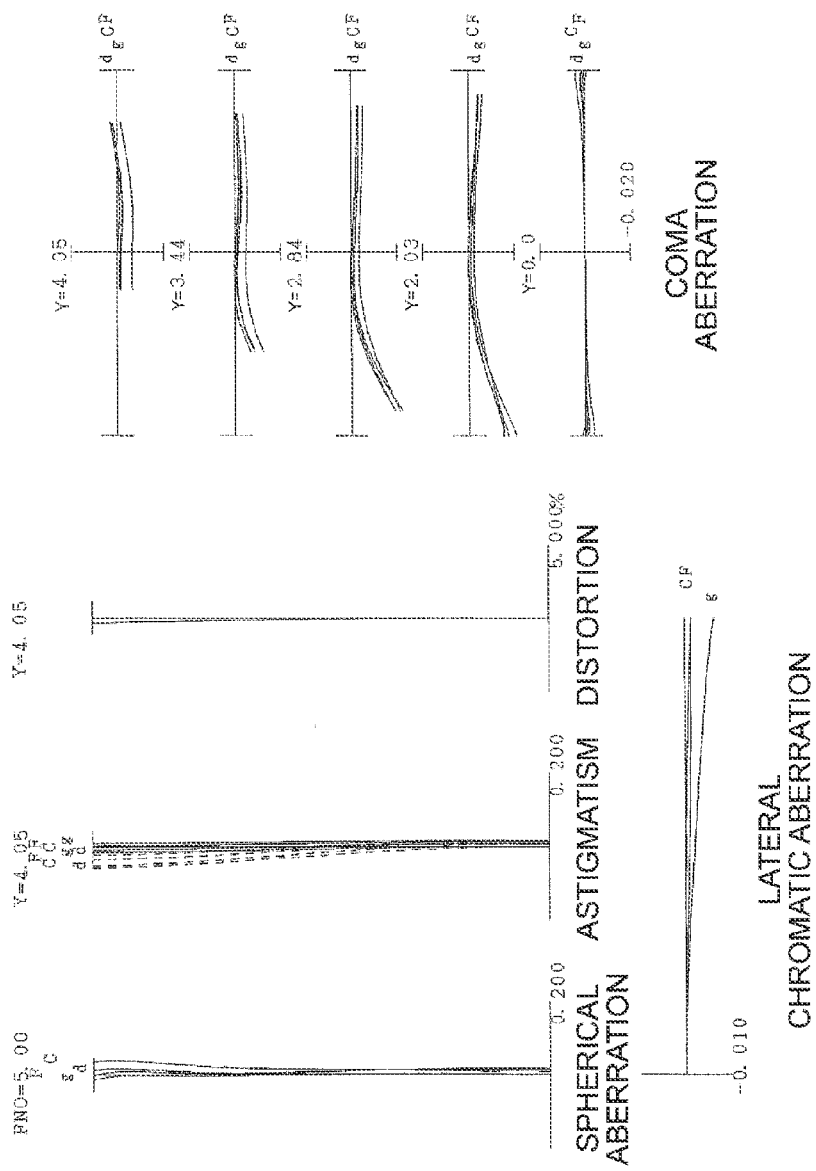

ZOOM LENS, OPTICAL APPARATUS, AND METHOD FOR MANUFACTURING THE ZOOM LENS

This is a continuation of PCT International Application No. PCT/JP2013/000201, filed on Jan. 17, 2013, which is hereby incorporated by reference. This application also claims the benefit of Japanese Patent Application No. 2012-013565, filed in Japan on Jan. 25, 2012, which is hereby incorporated by reference.

TECHNICAL FIELD

The present invention relates to a zoom lens, an optical apparatus, and a method for manufacturing the zoom lens.

TECHNICAL BACKGROUND

Zoom lenses used for an image capturing lens of a video camera, an electronic still camera or the like have been achieving smaller sizes and higher zoom ratios (e.g. see Patent Document 1).

PRIOR ARTS LIST

Patent Document

Patent Document 1: Japanese Laid-Open Patent Publication No. 2010-160242 (A)

SUMMARY OF THE INVENTION

Problems to be Solved by the Invention

Recently an even higher zoom ratio is demanded for a zoom lens.

With the foregoing in view, it is an object of the present invention to provide a zoom lens and an optical apparatus that are small and have high optical performance while having a high zoom ratio, and a method for manufacturing the zoom lens.

Means to Solve the Problems

To achieve this object, a zoom lens according to the present invention is a zoom lens having, in order from an object: a first lens group having positive refractive power; a second lens group having negative refractive power; a third lens group having positive refractive power; and a fourth lens group having positive refractive power, wherein the following conditional expression is satisfied.

$$1.90 < (-f2)/fw < 3.00$$

where f2 denotes a focal length of the second lens group, and fw denotes a focal length of the zoom lens in the wide-angle end state.

In this zoom lens, it is preferable that the following conditional expression is satisfied.

$$70.00 < vdp1$$

where vdp1 denotes an Abbe number of a positive lens disposed closest to the image plane in the first lens group.

In this zoom lens, it is preferable that the following conditional expression is satisfied.

$$0.005 < (-f2)/ft < 0.048$$

where ft denotes a focal length of the zoom lens in the telephoto end state.

In this zoom lens, it is preferable that the following conditional expression is satisfied.

$$0.05 < f1/ft < 0.50$$

where f1 denotes a focal length of the first lens group, and ft denotes a focal length of the zoom lens in the telephoto end state.

In this zoom lens, it is preferable that the first lens group includes, in order from the object, a cemented lens of a negative lens and a positive lens, a first positive lens and a second positive lens.

In this zoom lens, it is preferable that the first lens group, the second lens group, the third lens group and the fourth lens group move along the optical axis respectively, upon zooming.

In this zoom lens, it is preferable that the second lens group moves toward the image plane along the optical axis, and then moves toward the object, upon zooming.

In this zoom lens, it is preferable that the fourth lens group moves toward the object along the optical axis, and then moves toward the image plane, upon zooming.

In this zoom lens, it is preferable that an aperture stop is disposed between the second lens group and the fourth lens group, and the aperture stop moves together with the third lens group upon zooming.

In this zoom lens, it is preferable that an aperture stop is disposed between the second lens group and the third lens group.

In this zoom lens, it is preferable that the third lens group includes, in order from the object, a first positive lens, a cemented lens, a second positive lens and a negative lens.

In this zoom lens, it is preferable that the cemented lens of the third lens group is a cemented lens of a positive lens and a negative lens.

In this zoom lens, it is preferable that the cemented lens of the third lens group is a cemented lens of a positive lens and a negative lens, in order from the object.

In this zoom lens, it is preferable that the cemented lens of the third lens group has negative refractive power.

In this zoom lens, it is preferable that the second lens group includes, in order from the object, a first negative lens, a second negative lens and a cemented lens.

In this zoom lens, it is preferable that the cemented lens of the second lens group is a cemented lens of a positive lens and a negative lens.

In this zoom lens, it is preferable that the cemented lens of the second lens group is a cemented lens of a positive lens and a negative lens, in order from the object.

In this zoom lens, it is preferable that the cemented lens of the second lens group has positive refractive power.

In this zoom lens, it is preferable that the fourth lens group includes a cemented lens of a positive lens and a negative lens.

In this zoom lens, it is preferable that the fourth lens group includes a cemented lens of a positive lens and a negative lens, in order from the object.

In this zoom lens, it is preferable that the third lens group includes at least one aspherical lens.

An optical apparatus according to the present invention includes the above mentioned zoom lens.

A manufacturing method for a zoom lens according to the present invention is a method for manufacturing a zoom lens which includes, in order from an object: a first lens group having positive refractive power; a second lens group having negative refractive power; a third lens group having positive refractive power; and a fourth lens group having positive refractive power, and the following conditional expression is satisfied.

$$1.90 < (-f2)/fw < 3.00$$

where f2 denotes a focal length of the second lens group, and fw denotes a focal length of the zoom lens in the wide-angle end state.

In this manufacturing method, it is preferable that the following conditional expression is satisfied.

$$70.00 < vdp1$$

where vdp1 denotes an Abbe number of the positive lens disposed closest to the image plane in the first lens group.

In this manufacturing method, it is preferable that the following conditional expression is satisfied.

$$0.005 < (-f2)/ft < 0.048$$

where ft denotes a focal length of the zoom lens in the telephoto end state.

In this manufacturing method, it is preferable that the following conditional expression is satisfied.

$$0.05 < f1/ft < 0.50$$

where f1 denotes a focal length of the first lens group, and ft denotes a focal length of the zoom lens in the telephoto end state.

Advantageous Effects of the Invention

According to the present invention, a zoom lens and an optical apparatus that are small and have high optical performance while having a high zoom ratio, and a method for manufacturing the zoom lens can be provided.

BRIEF DESCRIPTION OF THE DRAWINGS

FIG. 3 are sets of graphs showing various aberrations of the zoom lens according to Example 1, where FIG. 3A is a set of graphs showing various aberrations of the zoom lens upon focusing on infinity in a first intermediate focal length state.

FIG. 7 are sets of graphs showing various aberrations of the zoom lens according to Example 2, where

FIG. 11 is a set of graphs showing various aberrations of the zoom lens according to Example 3, where

FIG. 15 are sets of graphs showing various aberrations of the zoom lens according to Example 4, where FIG. 15C is a set of graphs showing various aberrations of the zoom lens upon focusing on infinity in a third intermediate focal length state;

FIG. 17 show a digital camera (optical apparatus) including the zoom lens according to this embodiment, where

DESCRIPTION OF THE EMBODIMENTS

Figure 1:
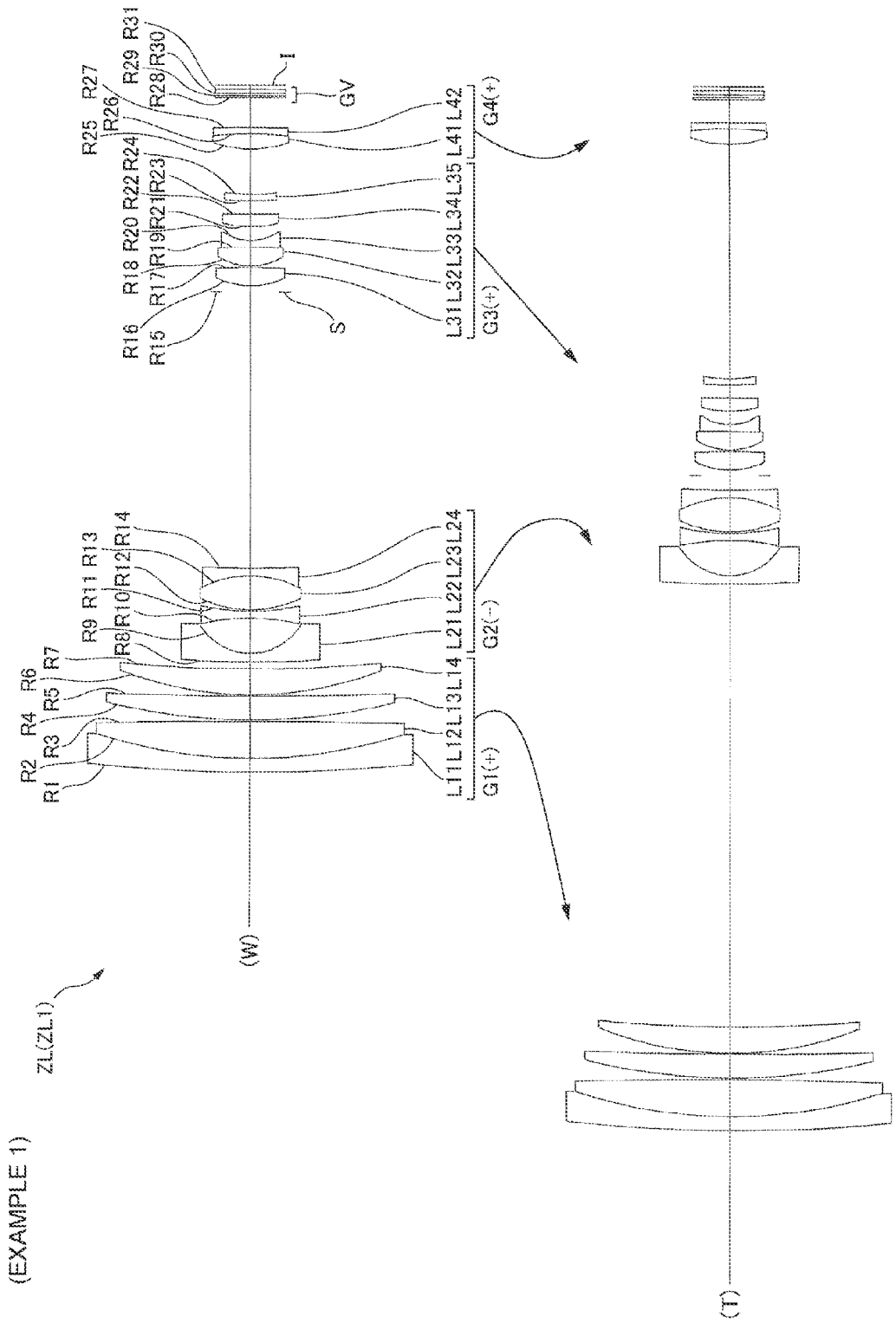
FIG. 1 shows a configuration of a zoom lens according to Example 1 and a zoom locus from a wide-angle end state (W) to a telephoto end state (T)

The embodiment of the present invention will now be described with reference to the drawings. As FIG. 1 shows, a zoom lens ZL according to this embodiment includes, in order from an object, a first lens group G1 having positive refractive power, a second lens group G2 having negative refractive power, a third lens group G3 having positive refractive power, and a fourth lens group G4 having positive refractive power. The zoom lens ZL of this embodiment satisfies the following conditional expression (1).

$$1.90 < (-f2)/fw < 3.00 \qquad (1)$$

where f2 denotes a focal length of the second lens group G2, and fw denotes a focal length of the zoom lens ZL in the wide-angle end state.

The conditional expression (1) specifies the ratio of the focal length of the second lens group G2 and the focal length of the zoom lens ZL in the wide-angle end state. If the upper limit value of the conditional expression (1) is exceeded, the zoom function performed by the second lens group G2 drops, and the zoom function must be performed by the first lens group G1 and the third lens group G3. This makes correction of spherical aberration during zooming difficult, which is not desirable. If the lower limit value of the conditional expression (1) is not reached, on the other hand, it becomes difficult to correct aberrations generated in the second lens group G2, and as a result, correction of astigmatism during zooming becomes difficult, which is not desirable.

To demonstrate the effect of this embodiment with certainty, it is preferable that the lower limit value of the conditional expression (1) is 1.92. It is even better if the lower limit value of the conditional expression (1) is 1.94. To demonstrate the effect of this embodiment with certainty, it is preferable that the upper limit value of the conditional expression (1) is 2.75. It is even better if the upper limit value of the conditional expression (1) is 2.50.

In the zoom lens ZL of this embodiment, it is preferable to satisfy the following conditional expression (2).

$$70.00 < vdp1 \quad (2)$$

where vdp1 denotes an Abbe number of a positive lens disposed closest to the image plane in the first lens group G1.

The conditional expression (2) specifies an Abbe number of the positive lens disposed closest to the image plane in the first lens group G1. If the lower limit value of the conditional expression (2) is not reached, it becomes difficult to satisfactorily correct lateral chromatic aberration that is generated in the first lens group G1, and as a result, it becomes difficult to satisfactorily correct lateral chromatic aberration of the zoom lens in the telephoto end state, which is not desirable.

To demonstrate the effect of this embodiment with certainty, it is preferable that the lower limit value of the conditional expression (2) is 75.00.

In the zoom lens ZL of this embodiment, it is preferable to satisfy the following conditional expression (3).

$$0.005 < (-f2)/ft < 0.048 \quad (3)$$

where ft denotes a focal length of the zoom lens ZL in the telephoto end state.

The conditional expression (3) specifies a ratio of the focal length of the second lens group G2 and the focal length of the zoom lens ZL in the telephoto end state. If the upper limit value of the conditional expression (3) is exceeded, the zoom function performed by the second lens group G2 drops, and the zoom function must be performed by the first lens group G1 and the third lens group G3. This makes correction of spherical aberration during zooming difficult, which is not desirable. If the lower limit value of the conditional expression (3) is not reached, on the other hand, it becomes difficult to correct aberrations generated in the second lens group G2, and as a result, correction of astigmatism during zooming becomes difficult, which is not desirable.

To demonstrate the effect of this embodiment with certainty, it is preferable that the lower limit value of the conditional expression (3) is 0.020. To demonstrate the effect of this embodiment with certainty, it is preferable that the upper limit value of the conditional expression (3) is 0.047.

In the zoom lens ZL of this embodiment, it is preferable to satisfy the following conditional expression (4).

$$0.05 < f1/ft < 0.50 \quad (4)$$

where f1 denotes a focal length of the first lens group G1, and ft denotes a focal length of the zoom lens ZL in the telephoto end state.

The conditional expression (4) specifies the ratio of the focal length of the first lens group G1 and the focal length of the zoom lens ZL in the telephoto end state. If the upper limit value of the conditional expression (4) is exceeded, the outer diameter of the first lens G1 becomes large, and the size of the entire camera becomes large, which is not desirable. Further, it becomes difficult to satisfactorily correct spherical aberration during zooming, which is not desirable. If the lower limit value of the conditional expression (4) is not reached, on the other hand, it becomes difficult to satisfactorily correct lateral chromatic aberration of the zoom lens in the telephoto end state, which is not desirable.

To demonstrate the effect of this embodiment with certainty, it is preferable that the lower limit value of the conditional expression (4) is 0.10. To demonstrate the effect of this embodiment with certainty, it is preferable that the upper limit value of the conditional expression (4) is 0.45.

In the zoom lens ZL of this embodiment, it is preferable that the first lens group G1 includes, in order from the object, a cemented lens of a negative lens and a positive lens, a first positive lens and a second positive lens. By this configuration, lateral chromatic aberration and spherical aberration that are generated in the first lens group G1 can be satisfactorily corrected, and as a result, lateral chromatic aberration and spherical aberration that are generated in the zoom lens in the telephoto end state can be satisfactorily corrected.

In the zoom lens ZL of this embodiment, it is preferable that the first lens group G1, the second lens group G2, the third lens group G3 and the fourth lens group G4 move along the optical axis respectively upon zooming. Thereby fluctuation of the image plane position caused by zooming can be satisfactorily corrected.

In the zoom lens ZL of this embodiment, the second lens group G2 moves toward the image plane along the optical axis, and then moves toward the object, upon zooming. Thereby fluctuation of the image plane position caused by zooming can be satisfactorily corrected.

In the zoom lens ZL of this embodiment, the fourth lens group G4 moves toward the object along the optical axis, and then moves toward the image plane, upon zooming. Thereby fluctuation of the image plane position caused by zooming can be satisfactorily corrected.

In the zoom lens ZL of this embodiment, it is preferable that an aperture stop S for determining brightness is disposed between the second lens group G2 and the fourth lens group G4, and the aperture stop S moves together with the third lens group G3 upon zooming. By this configuration, fluctuation of the diameter of the beam passing through the third lens group G3 can be suppressed, and fluctuation of spherical aberration caused by zooming can be satisfactorily corrected.

In the zoom lens ZL of this embodiment, it is preferable that an aperture stop S is disposed between the second lens group G2 and the third lens group G3. By this configuration, fluctuation of the diameter of the beam that passes through the third lens group G3 can be suppressed, and fluctuation of spherical aberration caused by zooming can be satisfactorily corrected.

In the zoom lens ZL of this embodiment, it is preferable that the third lens group G3 includes, in order from the object, a first positive lens, a cemented lens, a second positive lens and a negative lens. By this configuration, aberration generated in the third lens group G3 can be satisfactorily corrected, and as a result, fluctuation of spherical aberration and coma aberration caused by zooming in particular can be satisfactorily corrected.

In the zoom lens ZL of this embodiment, it is preferable that the cemented lens of the third lens group G3 is a cemented lens of a positive lens and a negative lens. By this configuration, aberrations generated in the third lens group G3 can be satisfactorily corrected, and as a result, fluctuation of spherical aberration and coma aberration caused by zooming in particular can be satisfactorily corrected. It is even better if the cemented lens of the third lens group G3 is a cemented lens of a positive lens and a negative lens in order from the object.

In the zoom lens ZL of this embodiment, it is preferable that the cemented lens of the third lens group G3 has negative refractive power. By this configuration, aberrations generated in the third lens group G3 can be satisfactorily corrected, and as a result, fluctuation of spherical aberration and coma aberration caused by zooming in particular can be satisfactorily corrected.

In the zoom lens ZL of this embodiment, it is preferable that the second lens group G2 includes, in order from the object, a first negative lens, a second negative lens and a cemented lens. By this configuration, aberrations generated in the second lens group G2 can be satisfactorily corrected, and as a result, astigmatism of the zoom lens in the wide-angle end state in particular can be satisfactorily corrected.

In the zoom lens ZL of this embodiment, it is preferable that the cemented lens of the second lens group G2 is a cemented lens of a positive lens and a negative lens. By this configuration, aberrations generated in the second lens group G2 can be satisfactorily corrected, and as a result, astigmatism generated in the zoom lens in the wide-angle end state in particular can be satisfactorily corrected. It is even better if the cemented lens of the second lens group G2 is a cemented lens of a positive lens and a negative lens in order from the object.

In the zoom lens ZL of this embodiment, it is preferable that the cemented lens of the second lens group G2 has positive refractive power. By this configuration, aberrations generated in the second lens group G2 can be satisfactorily corrected, and as a result, astigmatism generated in the zoom lens in the wide-angle end state in particular can be satisfactorily corrected.

In the zoom lens ZL of this embodiment, it is preferable that the fourth lens group G4 includes a cemented lens of a positive lens and a negative lens. By this configuration, lateral chromatic aberration generated in the fourth lens group G4 can be satisfactorily corrected, and as a result, lateral chromatic aberration generated by zooming in particular can be satisfactorily corrected. It is even better if the fourth lens group G4 includes a cemented lens of a positive lens and a negative lens, in order from the object.

In the zoom lens ZL of this embodiment, it is preferable that the third lens group includes at least one aspherical lens. By disposing an aspherical lens in the third lens group G3, fluctuation of spherical aberration caused by zooming can be satisfactorily corrected.

Figure 17A:
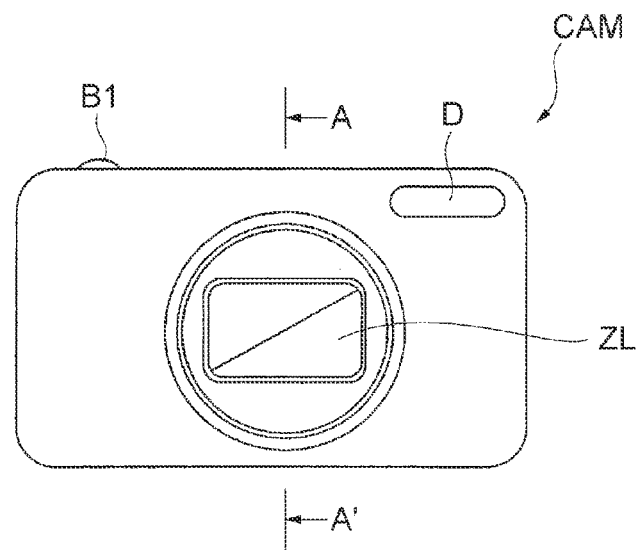
FIG. 17A is a front view and FIG. 17B is a rear view.
Figure 17B:
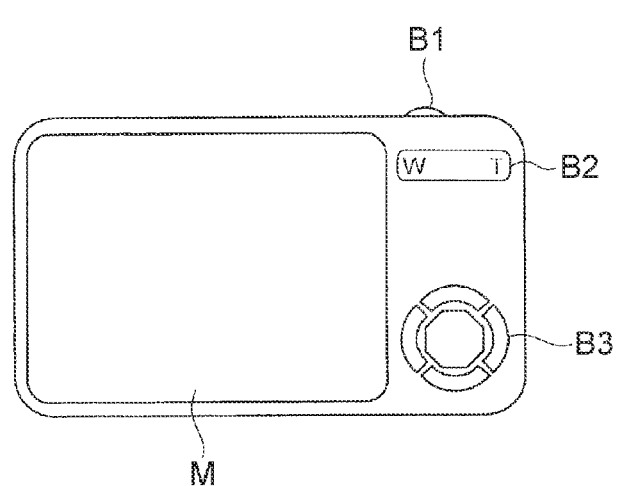
Figure 18:
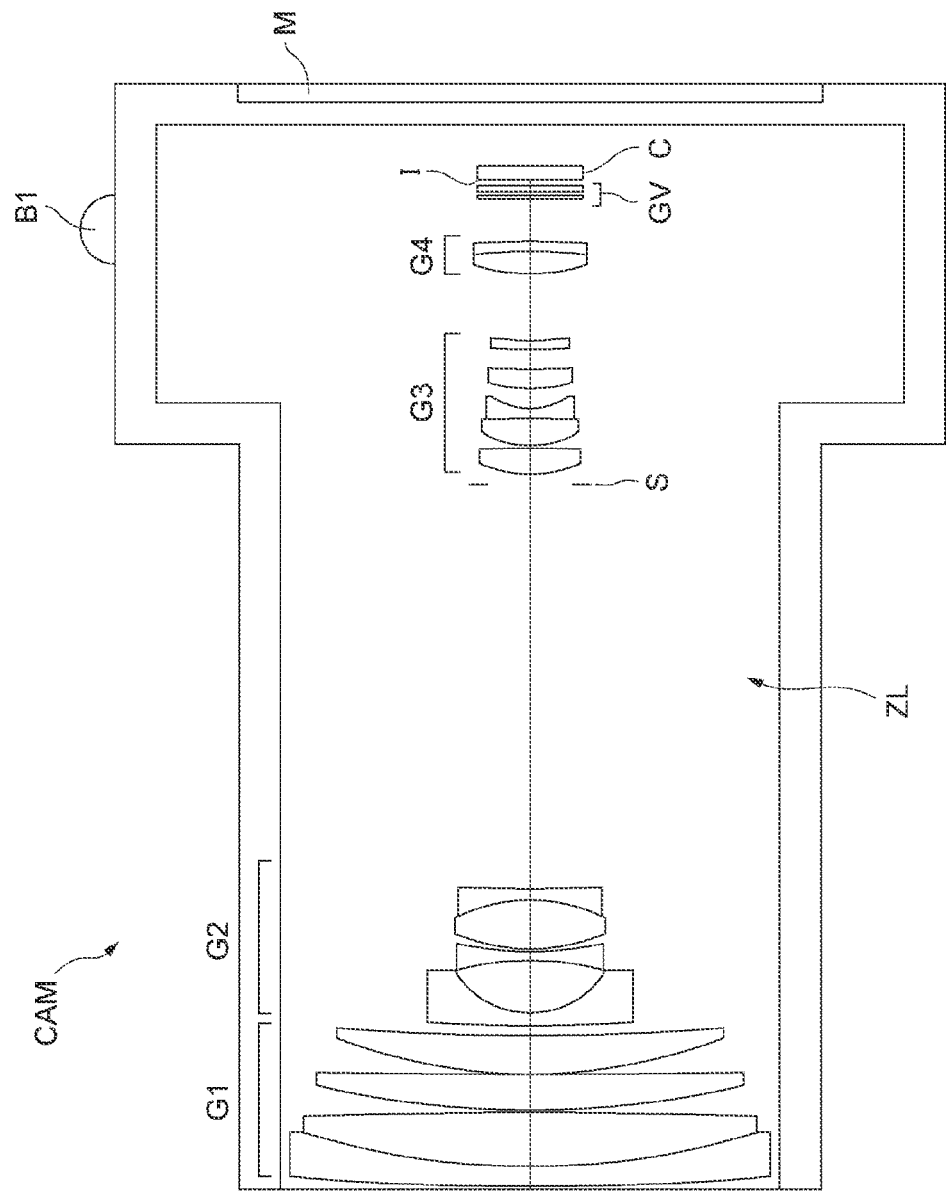
FIG. 18 is a cross-sectional view along the A-A' line in FIG. 17A.

FIG. 17 and FIG. 18 show a configuration of a digital still camera CAM (optical apparatus) as an optical apparatus including this zoom lens ZL. In the digital still camera CAM, if a power button (not illustrated) is pressed, a shutter (not illustrated) of an image capturing lens (zoom lens ZL) is opened, and light from an object is collected by the zoom lens ZL, and forms an image on a picture element C (e.g. CCD, CMOS) disposed on the image plane I. The object image formed on the picture element C is displayed on a liquid crystal monitor M disposed on the rear face of the digital still camera CAM. The user of the camera determines a composition while viewing the liquid crystal monitor M, then presses a release button B1 to photograph the object image using the picture element C, and records and stores the image in a memory (not illustrated).

In the camera CAM, an auxiliary light emitting unit D that emits auxiliary light when an object appears dark, a wide(W)-Tele(T) button B2 that is used to zoom the image capturing lens ZL from the wide-angle end state (W) to the telephoto end state (T), a function button B3 that is used to set various conditions of the digital still camera CAM or the like are disposed. In FIG. 17 and FIG. 18, the compact digital camera where the lens and camera body are integrated is shown as an example, but the present invention may be applied to a digital single lens reflex camera where the lens and the body are detachable.

Figure 19:
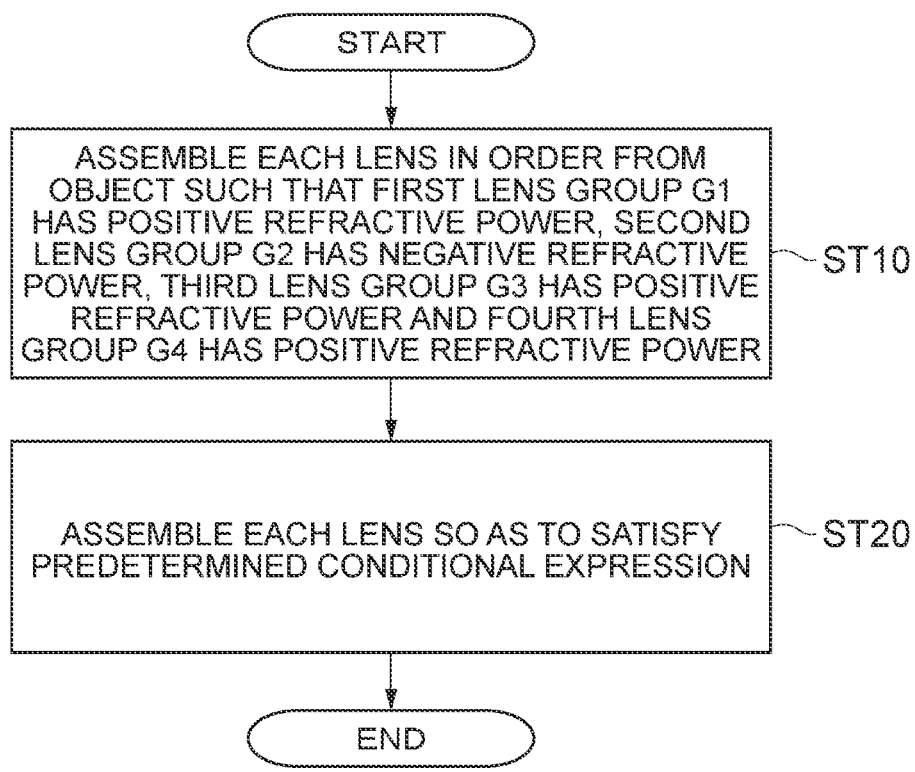
FIG. 19 is a flow chart depicting a method for manufacturing the zoom lens according to this embodiment.

A method for manufacturing the zoom lens ZL will now be described with reference to FIG. 19. First the first lens group G1, the second lens group G2, the third lens group G3 and the fourth lens group G4 are assembled in a lens barrel (step ST10). In this assembly step, each lens is arranged so that the first lens group G1 has positive refractive power, the second lens group G2 has negative refractive power, the third lens group G3 has positive refractive power, and the fourth lens group G4 has positive refractive power. Then each lens is assembled such that the focal length f2 of the second lens group G2 and the focal length fw of the zoom lens ZL in the wide-angle end state satisfy the above mentioned conditional expression (1) (step ST20).

According to the method for manufacturing the zoom lens according to this embodiment, a zoom lens that is suitable for a video camera, an electronic still camera or the like using a solid-state picture element, and that has a larger zoom ratio compared with prior arts and has small size and high image quality, can be implemented. It is preferable that each of the above mentioned conditions (conditional expression (2) to conditional expression (4)) is satisfied.

EXAMPLES

Each example of this embodiment will now be described with reference to the drawings. Table 1 to Table 4 shown below list the data of Example 1 to Example 4.

In [Lens Data] in each table, the surface number is the sequential number of the lens surface counted from the object side in the light traveling direction, R denotes the radius of curvature of each lens surface, D denotes a distance from each optical surface to the next optical surface (or image plane) on the optical axis, nd denotes a refractive index at the d-line (wavelength: 587.56 nm), and νd denotes an Abbe number with respect to the d-line (wavelength: 587.56 nm). "∞" in the radius of curvature indicates a plane or an aperture. The refractive index of air "1.000000" is omitted.

In [Aspherical Data] in each table, a form of the aspherical surface shown in [Lens Data] is indicated by the following expression (a). Here $X(y)$ denotes a distance in the optical axis direction from a tangential plane at a vertex of the aspherical surface to a position on the aspherical surface at height y, r denotes a radius of curvature (paraxial radius of curvature) of the reference spherical surface, κ denotes a conical coefficient, Ai denotes an aspherical coefficient of the i-th order. "E-n" indicates "$\times 10^{-n}$" (n: integer). For example, $1.234\text{E-}05 = 1.234 \times 10^{-5}$.

$$X(y) = y^2 / \left[ r \times \{ 1 + (1 - \kappa \times y^2 / r^2)^{1/2} \} \right] + \\ A4 \times y^4 + A6 \times y^6 + A8 \times y^8 + A10 \times y^{10} \quad (a)$$

In [General Data] in each table, f denotes a focal length, FNo denotes an F number, ω denotes a half angle of view, Y denotes an image height, TL denotes a total lens length, Bf denotes a distance from an image plane side surface of an optical member disposed closest to the image plane to a paraxial image plane, Bf (air conversion) denotes a distance from the last lens surface to the paraxial image plane converted into air.

In [Zooming Data] in each table, Di (i is an integer) denotes a variable distance between the i-th surface and the (i+1)-th surface in each state of the wide-angle end state, the intermediate focal length state (intermediate position 1, intermediate position 2, intermediate position 3) and the telephoto end state.

In [Zoom Lens Group Data] in each table, G denotes a group number, "First surface of group" indicates a surface number of the surface closest to the object in each group, "Group focal length" indicates a focal length of each lens group, and "Lens configuration length" indicates a distance on the optical axis from the lens surface closest to the object to the lens surface closest to the image in each group.

In [Conditional Expression] in each table, a value corresponding to each conditional expression (1) to (4) is shown.

In all the data values hereinbelow, "mm" is normally used as the unit of focal length f, radius of curvature R, surface distance D and other lengths, but the unit is not limited to "mm", but another appropriate unit may be used, since equivalent optical performance is obtained even if the optical system is proportionally expanded or proportionally reduced.

This description on the table is the same for all the examples, and is therefore omitted hereinbelow.

Example 1

Example 1 will be described with reference to FIG. 1 to FIG. 4 and Table 1. FIG. 1 shows a configuration of a zoom lens ZL (ZL1) according to Example 1, and a zoom locus from a wide-angle end state (W) to a telephoto end state (T). As FIG. 1 shows, the zoom lens ZL1 according to Example 1 includes, in order from an object, a first lens group G1 having positive refractive power, a second lens group G2 having negative refractive power, an aperture stop S used for adjusting the quantity of light, a third lens group G3 having positive refractive power, and a fourth lens group G4 having positive refractive power.

The first lens group G1 includes, in order from the object, a cemented lens of a negative lens L11 in a meniscus form having a convex surface facing the object and a positive lens L12 in a biconvex form, a first positive lens L13 in a meniscus form having a convex surface facing the object, and a second positive lens L14 in a meniscus form having a convex surface facing the object.

The second lens group G2 includes, in order from the object, a first negative lens L21 in a meniscus form having a convex surface facing the object, a second negative lens L22 in a biconcave form, and a cemented positive lens of a positive lens L23 in a biconvex form and a negative lens L24 in a biconcave form.

The third lens group G3 includes, in order from the object, a first positive lens L31 in a biconvex form, a negative cemented lens of a positive lens L32 in a biconvex form and a negative lens L33 in a biconcave form, a second positive lens L34 in a biconvex form, and a negative lens L35 in a meniscus form having a convex surface facing the object.

The fourth lens group G4 includes, in order from the object, a cemented lens of a positive lens L41 in a biconvex form and a negative lens L42 in a meniscus form having a convex surface facing the image plane I.

The aperture stop S for determining brightness is disposed near the object side of the third lens group G3, and moves together with the third lens group G3 upon zooming from the wide-angle end state to the telephoto end state. Between the fourth lens group G4 and the image plane I, a glass block GV, such as a low pass filter or an infrared cut-off filter, for cutting a spatial frequency exceeding the critical resolution of a solid-state picture element C (e.g. CCD, CMOS) disposed on the image plane I, is disposed.

In the zoom lens ZL1 having this configuration, all four lens groups G1 to G4 move upon zooming from the wide-angle end state to the telephoto end state. The first lens group G1 moves toward the image plane I first and then moves toward the object upon zooming. The second lens group G2 moves toward the image plane I first and then moves toward the object upon zooming. The third lens group G3 moves toward the object upon zooming. The fourth lens group G4 moves toward the object first and then moves toward the image plane I upon zooming. The aperture stop S used for adjusting the quantity of light moves together with the third lens group G3 upon zooming.

Table 1 shows each data value of Example 1. The radius of curvature R of surface 1 to surface 31 in Table 1 correspond to numerals R1 to R31 attached to surface 1 to surface 31 in FIG. 1. In Example 1, surfaces 16, 17, 21 and 22 are aspherical.

TABLE 1

| [Lens Data] | | | | |
|---|---|---|---|---|
| Surface number | R | D | nd | vd |
| Object surface | ∞ | | | |
| 1 | 203.3006 | 1.8000 | 1.910822 | 35.25 |
| 2 | 65.1862 | 4.8000 | 1.497820 | 82.57 |
| 3 | −820.7729 | 0.2000 | | |
| 4 | 78.2775 | 3.1000 | 1.593190 | 67.90 |
| 5 | 542.4719 | 0.1000 | | |
| 6 | 46.5099 | 3.4000 | 1.497820 | 82.57 |
| 7 | 181.9339 | D7 | | |
| 8 | 133.0132 | 1.1000 | 1.883000 | 40.66 |
| 9 | 7.6782 | 4.5500 | | |
| 10 | −29.9377 | 0.9000 | 1.772500 | 49.62 |
| 11 | 29.2422 | 0.2000 | | |
| 12 | 15.4896 | 4.4000 | 1.805180 | 25.45 |
| 13 | −14.1793 | 1.0000 | 1.883000 | 40.66 |
| 14 | 142.5969 | D14 | | |
| 15 (aperture stop) | ∞ | 0.7500 | | |
| *16 (aspherical) | 9.8656 | 2.4000 | 1.592014 | 67.02 |
| *17 (aspherical) | −99.2236 | 0.2000 | | |

TABLE 1-continued

| | | | | |
|---|---|---|---|---|
| 18 | 8.1763 | 2.4000 | 1.497820 | 82.57 |
| 19 | −338.7212 | 0.9000 | 1.834000 | 37.18 |
| 20 | 6.5839 | 1.7600 | | |
| *21 (aspherical) | 14.4704 | 1.7000 | 1.693500 | 53.20 |
| *22 (aspherical) | −101.4600 | 1.7137 | | |
| 23 | 58.9827 | 0.8000 | 1.834810 | 42.73 |
| 24 | 21.3624 | D24 | | |
| 25 | 15.2939 | 2.0000 | 1.487490 | 70.32 |
| 26 | −41.9992 | 0.8000 | 1.801000 | 34.92 |
| 27 | −1222.1037 | D27 | | |
| 28 | ∞ | 0.2100 | 1.516800 | 63.88 |
| 29 | ∞ | 0.3900 | | |
| 30 | ∞ | 0.5000 | 1.516800 | 63.88 |
| 31 | ∞ | Bf | | |
| Image plane | ∞ | | | |

[Aspherical Data]

Surface 16

$\kappa = 1.3074$, $A4 = -1.17642E-04$, $A6 = -1.10244E-06$, $A8 = 0.00000E+00$, $A10 = 0.00000E+00$ Surface 17

$\kappa = 1.0000$, $A4 = -2.52399E-05$, $A6 = 8.16603E-07$, $A8 = 0.00000E+00$, $A10 = 0.00000E+00$ Surface 21

$\kappa = -2.7030$, $A4 = 8.76599E-05$, $A6 = 1.38455E-05$, $A8 = 0.00000E+00$, $A10 = 0.00000E+00$ Surface 22

$\kappa = 10.0000$, $A4 = 3.16349E-05$, $A6 = 1.36321E-05$, $A8 = 0.00000E+00$, $A10 = 0.00000E+00$

[General Data]
Zoom ratio 43.531

| | Wide-angle end | Intermediate position 1 | Intermediate position 2 | Intermediate position 3 | Telephoto end |
|---|---|---|---|---|---|
| f | 4.05000 | 10.80000 | 27.00150 | 68.80000 | 176.29999 |
| FNo | 2.92177 | 3.69237 | 4.52356 | 5.02635 | 6.13185 |
| ω | 44.95413 | 20.71051 | 8.51524 | 3.37359 | 1.29406 |
| Y | 7.00000 | 7.80000 | 7.80000 | 7.80000 | 7.80000 |
| TL | 89.12425 | 90.99504 | 108.43635 | 123.92045 | 135.26689 |
| Bf | 0.53000 | 0.53000 | 0.53000 | 0.53000 | 0.53000 |
| Bf(air conversion) | 5.24508 | 12.23380 | 20.35722 | 24.85721 | 4.38972 |

[Zooming Data]

| Variable distance | Wide-angle end | Intermediate position 1 | Intermediate position 2 | Intermediate position 3 | Telephoto end |
|---|---|---|---|---|---|
| D7 | 0.89999 | 15.66279 | 33.38828 | 48.83598 | V57.34782 |
| D14 | 35.85520 | 15.78868 | 7.97902 | 3.51541 | 1.85000 |
| D24 | 5.90788 | 6.09366 | 5.49573 | 5.49573 | 30.46324 |
| D27 | 3.85699 | 10.84570 | 18.96913 | 23.46913 | 3.00164 |

[Zoom Lens Group Data]

| Group number | First surface of group | Group focal length | Lens configuration length |
|---|---|---|---|
| G1 | 1 | 75.37541 | 13.4 |
| G2 | 8 | −7.90835 | 12.15 |
| G3 | 16 | 16.60536 | 11.87 |
| G4 | 25 | 39.44727 | 2.8 |

[Conditional Expressions]

Conditional expression (1) $(-f2)/fw = 1.953$
Conditional expression (2) $vdp1 = 82.57$
Conditional expression (3) $(-f2)/ft = 0.045$
Conditional expression (4) $f1/ft = 0.428$ As the data in Table 1 shows, the zoom lens ZL1 according to Example 1 satisfies all of the conditional expressions (1) to (4).

Figure 2:
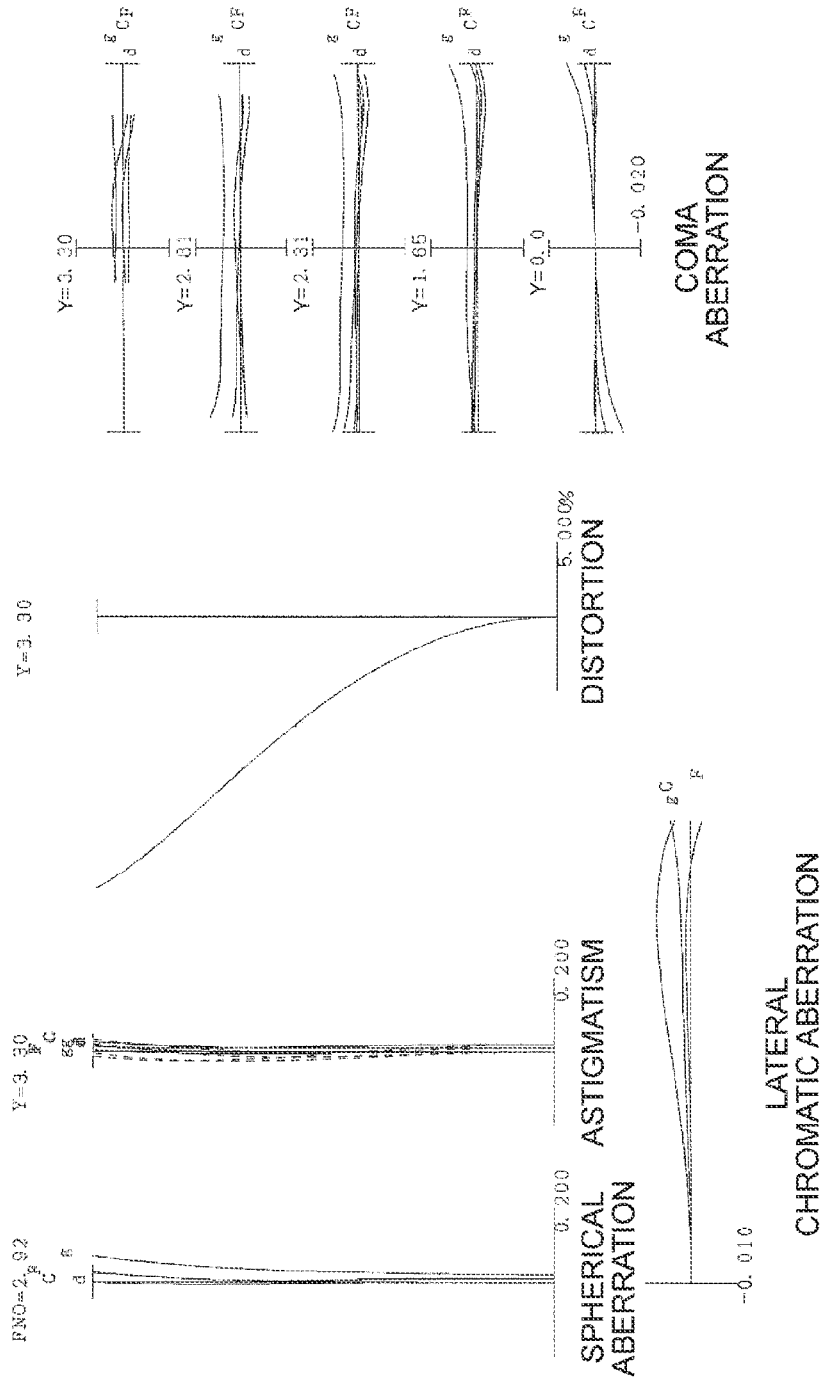
FIG. 2 is a set of graphs showing various aberrations of the zoom lens according to Example 1 upon focusing on infinity in the wide-angle end state.
Figure 3B:
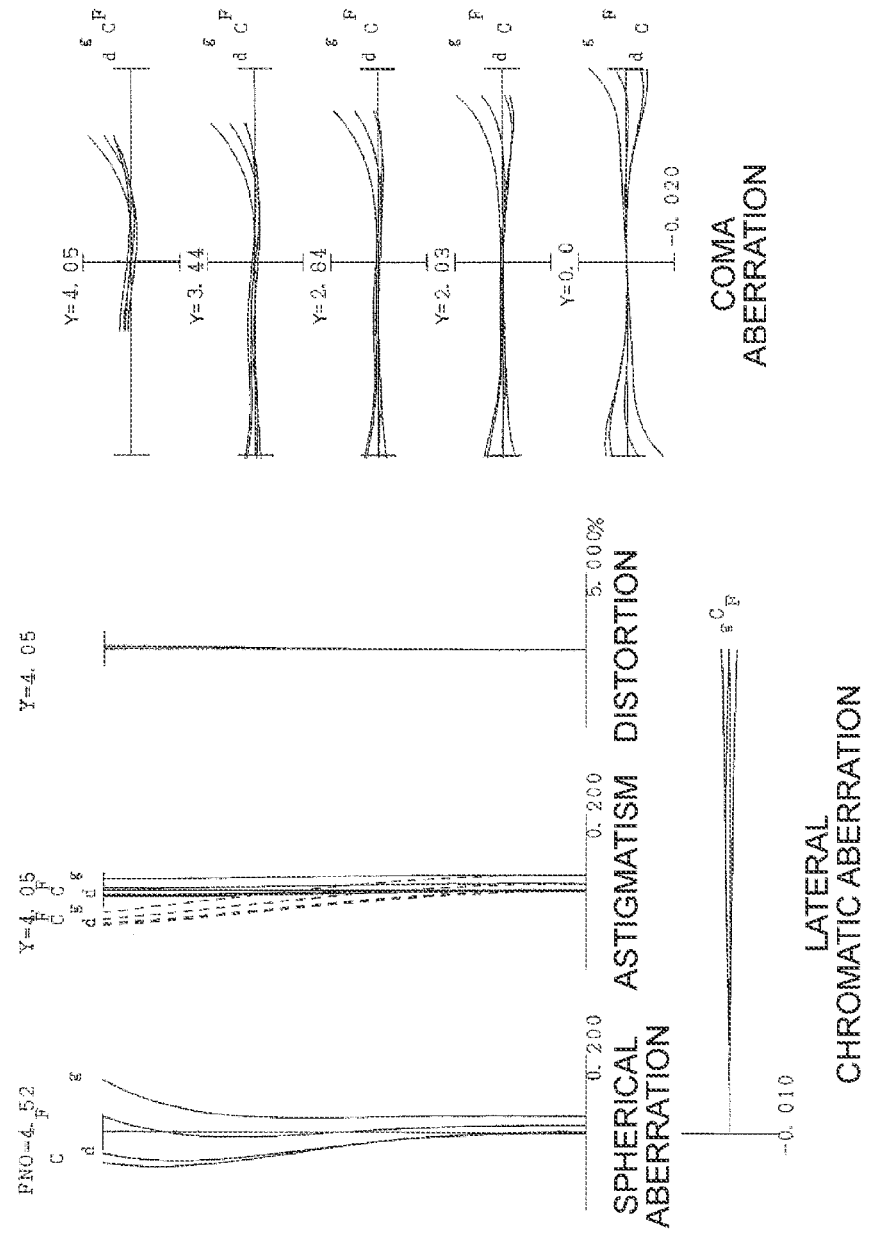
FIG. 3B is a set of graphs showing various aberrations of the zoom lens upon focusing on infinity in a second intermediate focal length state.
Figure 3C:
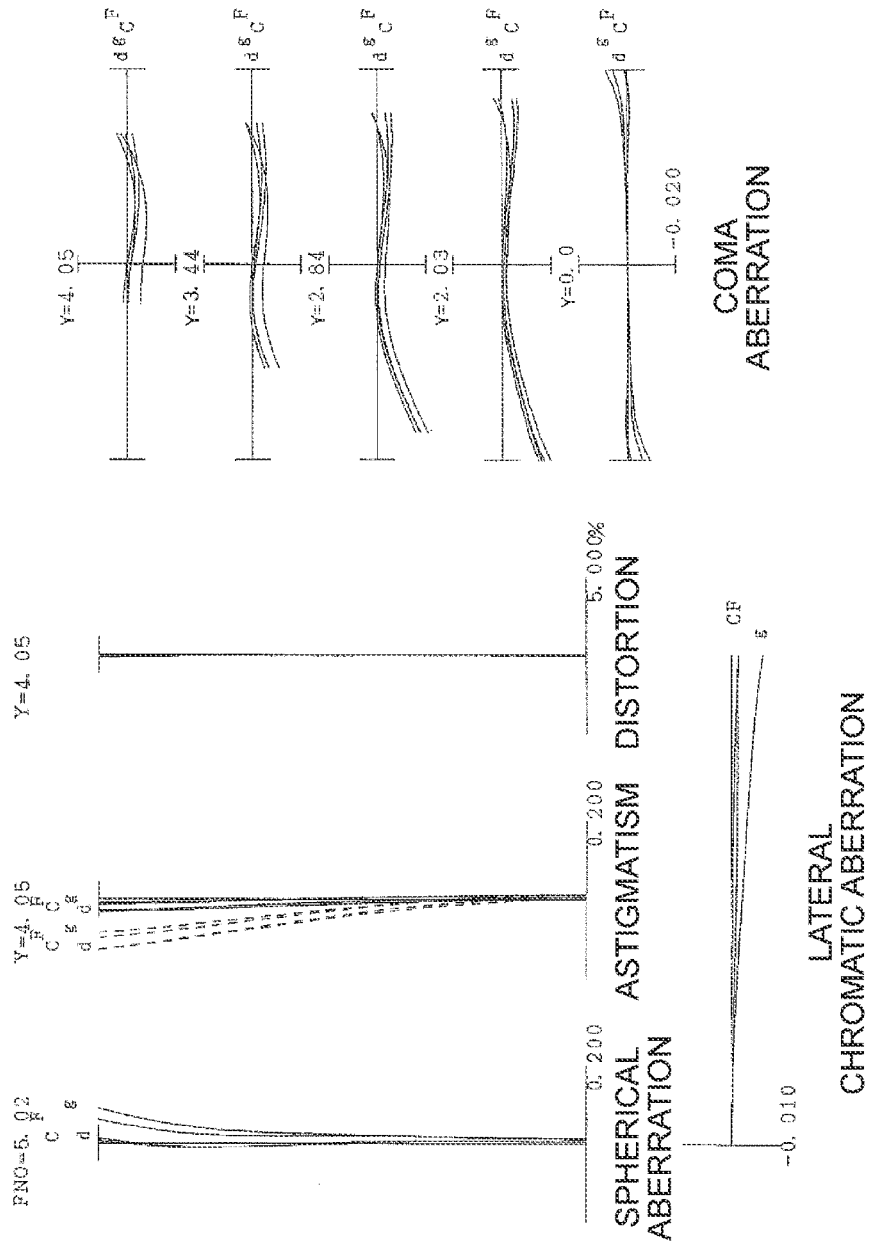
FIG. 3C is a set of graphs showing various aberrations of the zoom lens upon focusing on infinity in a third intermediate focal length state.
Figure 4:
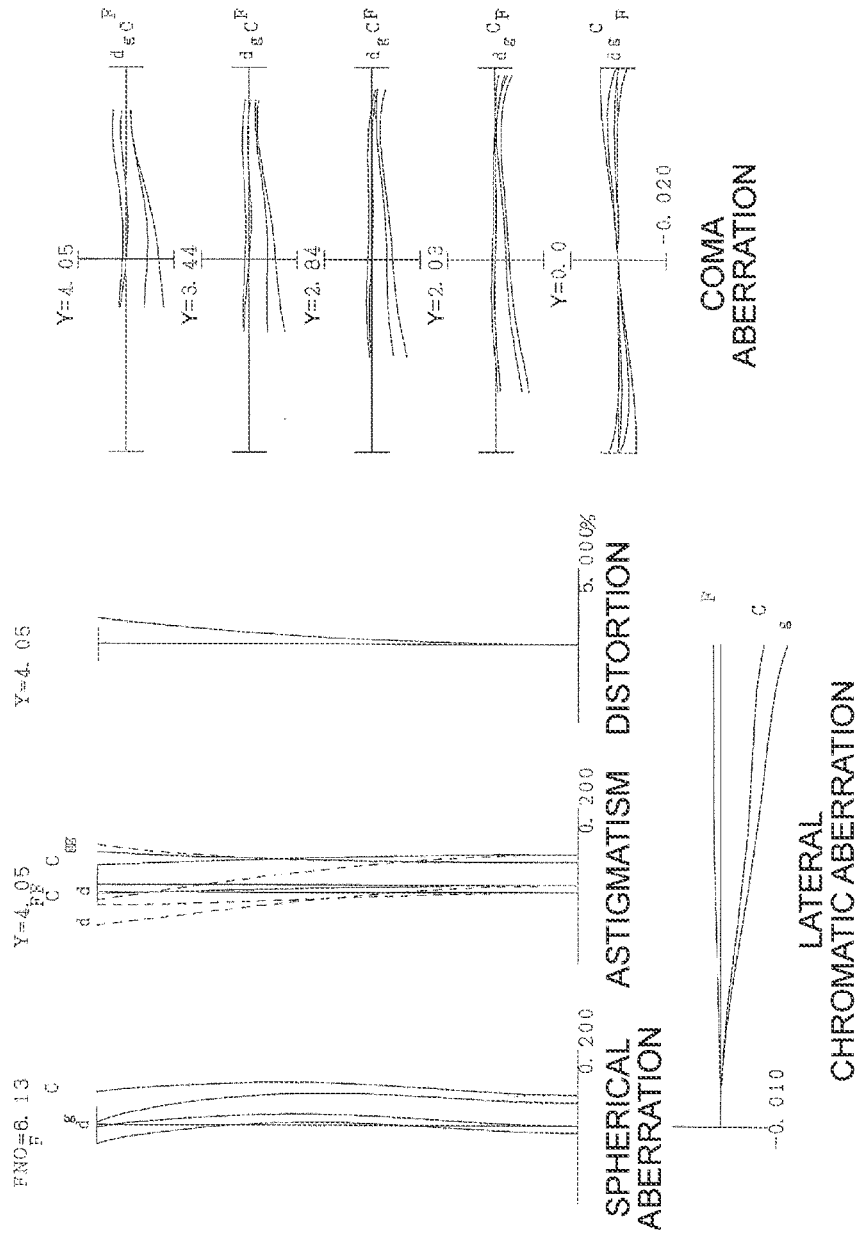
FIG. 4 is a set of graphs showing various aberrations of the zoom lens according to Example 1 upon focusing on infinity in the telephoto end state.

FIG. 2 to FIG. 4 are graphs showing various aberrations of the zoom lens ZL1 according to Example 1. Here FIG. 2 is a set of graphs showing various aberrations upon focusing on infinity in the wide-angle end state. FIG. 3A is a set of graphs showing various aberrations upon focusing on infinity in a first intermediate focal length state (intermediate position 1), FIG. 3B is a set of graphs showing various aberrations upon focusing on infinity in a second intermediate focal length state (intermediate position 2), and FIG. 3C is a set of graphs showing various aberrations upon focusing on infinity in the third intermediate focal length state (intermediate position 3). FIG. 4 is a set of graphs showing various aberrations upon focusing on infinity in a telephoto end state.

In each graph showing aberrations, ENO denotes an F number, and Y denotes an image height. In the graph showing spherical aberration, the solid line indicates the spherical aberration. In the graph showing astigmatism, the solid line indicates the sagittal image surface, and the broken line indicates the meridional image surface. In the graph showing coma aberration, the solid line indicates the meridional coma. The description on the graph showing aberrations is the same as for the other examples, where this description is therefore omitted.

As each graph showing aberrations clarifies, in Example 1, various aberrations are satisfactorily corrected in each focal length state from the wide-angle end state to the telephoto end state, demonstrating excellent image forming performance.

Example 2

Figure 5:
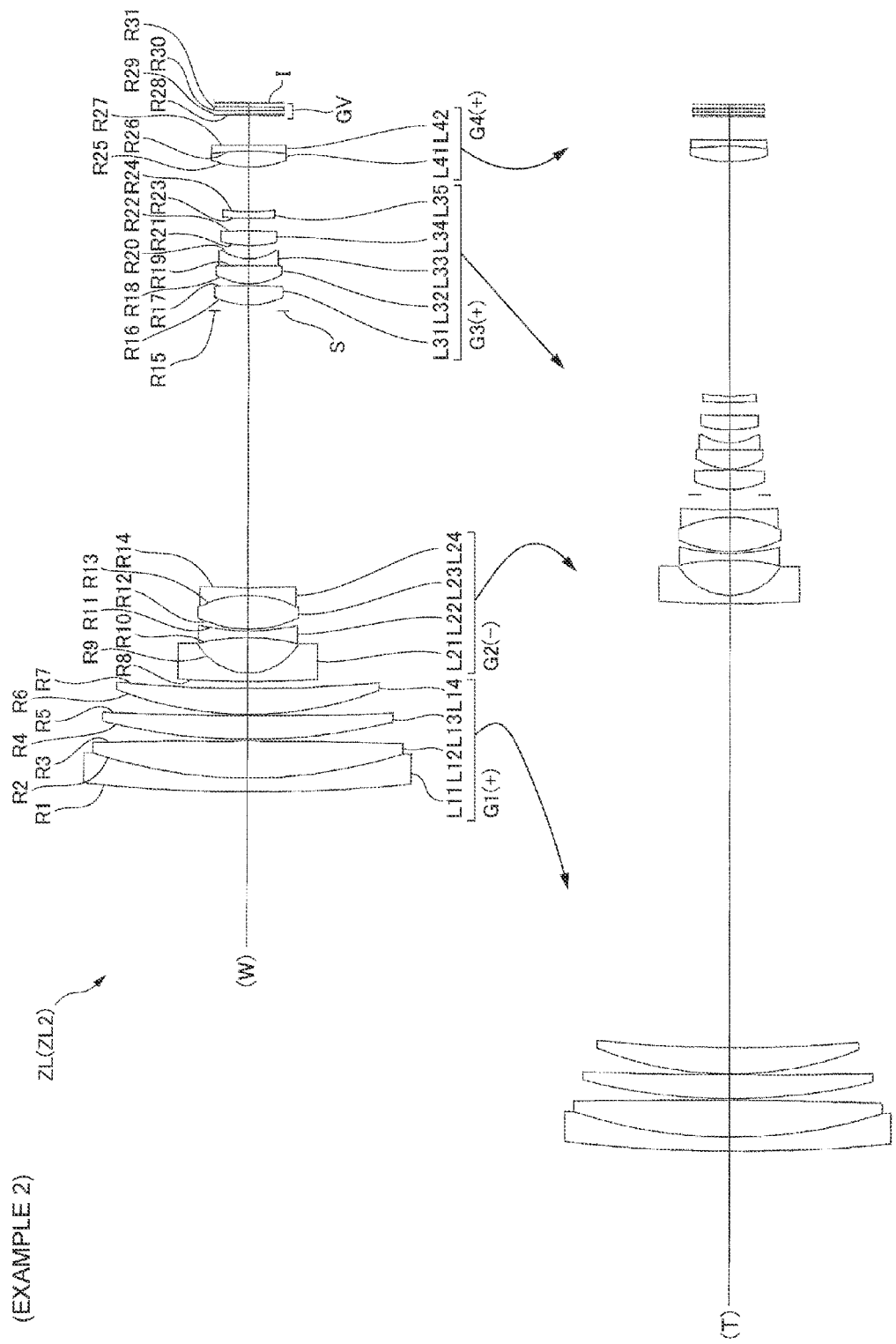
FIG. 5 shows a configuration of a zoom lens according to Example 2 and a zoom locus from a wide-angle end state (W) to a telephoto end state (T)

Example 2 will be described with reference to FIG. 5 to FIG. 8 and Table 2. FIG. 5 shows a configuration of a zoom lens ZL (ZL2) according to Example 2, and a zoom locus from a wide-angle end state (W) to a telephoto end state (T). As FIG. 5 shows, the zoom lens ZL2 according to Example 2 includes, in order from an object, a first lens group G1 having positive refractive power, a second lens group G2 having negative refractive power, an aperture stop S used for adjusting the quantity of light, a third lens group G3 having positive refractive power, and a fourth lens group G4 having positive refractive power.

The first lens group G1 includes, in order from the object, a cemented lens of a negative lens L11 in a meniscus form having a convex surface facing the object and a positive lens L12 in a biconvex form, a first positive lens L13 in a meniscus form having a convex surface facing the object, and a second positive lens L14 in a meniscus form having a convex surface facing the object.

The second lens group G2 includes, in order from the object, a first negative lens L21 in a meniscus form having a convex surface facing the object, a second negative lens L22 in a biconcave form, and a cemented positive lens of a positive lens L23 in a biconvex form and a negative lens L24 in a biconcave form.

The third lens group G3 includes, in order from the object, a first positive lens L31 in a biconvex form, a negative cemented lens of a positive lens L32 in a biconvex form and a negative lens L33 in a biconcave form, a second positive lens L34 in a biconvex form, and a negative lens L35 in a meniscus form having a convex surface facing the object.

The fourth lens group G4 includes a cemented lens of a positive lens L41 in a biconvex form and a negative lens L42 in a meniscus form having a convex surface facing the image plane I.

The aperture stop S for determining brightness is disposed near the object side of the third lens group G3, and moves together with the third lens group G3 upon zooming from the wide-angle end state to the telephoto end state. Between the fourth lens group G4 and the image plane I, a glass block GV, such as a low pass filter or an infrared cut-off filter, for cutting a spatial frequency exceeding the critical resolution of a solid-state picture element C (e.g. CCD, CMOS) disposed on the image plane I, is disposed.

In the zoom lens ZL2 having this configuration, all four lens groups G1 to G4 move upon zooming from the wide-angle end state to the telephoto end state. The first lens group G1 moves toward the image plane I first and then moves toward the object upon zooming. The second lens group G2 moves toward the image plane I first and then moves toward the object upon zooming. The third lens group G3 moves toward the object upon zooming. The fourth lens group G4 moves toward the object first and then moves toward the image plane I upon zooming. The aperture stop S used for adjusting the quantity of light moves together with the third lens group G3 upon zooming.

Table 2 shows each data value of Example 2. The radius of curvature R of surface 1 to surface 31 in Table 2 correspond to numerals R1 to R31 attached to surface 1 to surface 31 in FIG. 5. In Example 2, surfaces 16, 17, 21 and 22 are aspherical.

TABLE 2

| [Lens Data] | | | | |
|---|---|---|---|---|
| Surface number | R | D | nd | vd |
| Object surface | ∞ | | | |
| 1 | 205.7425 | 1.8000 | 1.910822 | 35.25 |
| 2 | 65.3792 | 4.8000 | 1.497820 | 82.57 |
| 3 | −797.7301 | 0.2000 | | |
| 4 | 77.7550 | 3.1000 | 1.593190 | 67.90 |
| 5 | 550.0717 | 0.1000 | | |
| 6 | 46.5993 | 3.4000 | 1.497820 | 82.57 |
| 7 | 179.8303 | D7 | | |
| 8 | 132.3080 | 1.1000 | 1.883000 | 40.66 |
| 9 | 7.6749 | 4.5500 | | |
| 10 | −30.0399 | 0.9000 | 1.772500 | 49.62 |
| 11 | 29.2159 | 0.2000 | | |
| 12 | 15.4674 | 4.4000 | 1.805180 | 25.45 |
| 13 | −14.1735 | 1.0000 | 1.883000 | 40.66 |
| 14 | 140.2237 | D14 | | |
| 15 (aperture stop) | ∞ | 0.7500 | | |
| *16 (aspherical) | 10.2765 | 2.5000 | 1.592014 | 67.02 |
| *17 (aspherical) | −80.6168 | 0.2000 | | |

TABLE 2-continued

| | | | | |
|---|---|---|---|---|
| 18 | 7.9413 | 2.4000 | 1.497820 | 82.57 |
| 19 | −1870.5157 | 0.9000 | 1.834000 | 37.18 |
| 20 | 6.4894 | 1.6983 | | |
| *21 (aspherical) | 14.7287 | 1.9000 | 1.693500 | 53.20 |
| *22 (aspherical) | −89.4070 | 1.6715 | | |
| 23 | 71.3882 | 0.8000 | 1.834810 | 42.73 |
| 24 | 22.8314 | D24 | | |
| 25 | 15.2687 | 2.0000 | 1.487490 | 70.32 |
| 26 | −42.6302 | 0.8000 | 1.801000 | 34.92 |
| 27 | −1642.7065 | D27 | | |
| 28 | ∞ | 0.2100 | 1.516800 | 63.88 |
| 29 | ∞ | 0.3900 | | |
| 30 | ∞ | 0.5000 | 1.516800 | 63.88 |
| 31 | ∞ | Bf | | |
| Image plane | ∞ | | | |

[Aspherical Data]

Surface 16

$\kappa = 1.4963$, $A4 = -1.34187E-04$, $A6 = -1.18081E-06$, $A8 = 0.00000E+00$, $A10 = 0.00000E+00$ Surface 17

$\kappa = 1.0000$, $A4 = -2.25423E-05$, $A6 = 1.01738E-06$, $A8 = 0.00000E+00$, $A10 = 0.00000E+00$ Surface 21

$\kappa = -2.1813$, $A4 = 1.15584E-04$, $A6 = 1.58804E-05$, $A8 = 0.00000E+00$, $A10 = 0.00000E+00$ Surface 22

$\kappa = 10.0000$, $A4 = 6.10576E-05$, $A6 = 1.47636E-05$, $A8 = 0.00000E+00$, $A10 = 0.00000E+00$

[General Data]
Zoom ratio 43.531

| | Wide-angle end | Intermediate position 1 | Intermediate position 2 | Intermediate position 3 | Telephoto end |
|---|---|---|---|---|---|
| f | 4.05000 | 10.80000 | 27.00150 | 68.80000 | 176.29999 |
| FNo | 2.92149 | 3.69180 | 4.52268 | 5.02531 | 6.13087 |
| ω | 44.95413 | 20.71051 | 8.51524 | 3.37359 | 1.29406 |
| Y | 7.00000 | 7.80000 | 7.80000 | 7.80000 | 7.80000 |
| TL | 89.27690 | 91.14769 | 108.58900 | 124.07310 | 135.41954 |
| Bf | 0.53000 | 0.53000 | 0.53000 | 0.53000 | 0.53000 |
| Bf(air conversion) | 5.23950 | 12.22823 | 20.35165 | 24.85164 | 4.38415 |

[Zooming Data]

| Variable distance | Wide-angle end | Intermediate position 1 | Intermediate position 2 | Intermediate position 3 | Telephoto end |
|---|---|---|---|---|---|
| D7 | 0.89999 | 15.66279 | 33.38827 | 48.83598 | 57.34782 |
| D14 | 35.85520 | 15.78868 | 7.97902 | 3.51540 | 1.85000 |
| D24 | 5.87044 | 6.05623 | 5.45830 | 5.45830 | 30.42580 |
| D27 | 3.85141 | 10.84013 | 18.96356 | 23.46356 | 2.99607 |

[Zoom Lens Group Data]

| Group number | First surface of group | Group focal length | Lens configuration length |
|---|---|---|---|
| G1 | 1 | 75.37541 | 13.4 |
| G2 | 8 | −7.90835 | 12.15 |
| G3 | 16 | 16.60536 | 11.87 |
| G4 | 25 | 39.44727 | 2.8 |

[Conditional Expressions]

Conditional expression (1) $(-f2)/fw = 1.953$
Conditional expression (2) $vdp1 = 82.57$
Conditional expression (3) $(-f2)/ft = 0.045$
Conditional expression (4) $f1/ft = 0.428$ As the data in Table 2 shows, the zoom lens ZL2 according to Example 2 satisfies all of the conditional expressions (1) to (4).

Figure 6:
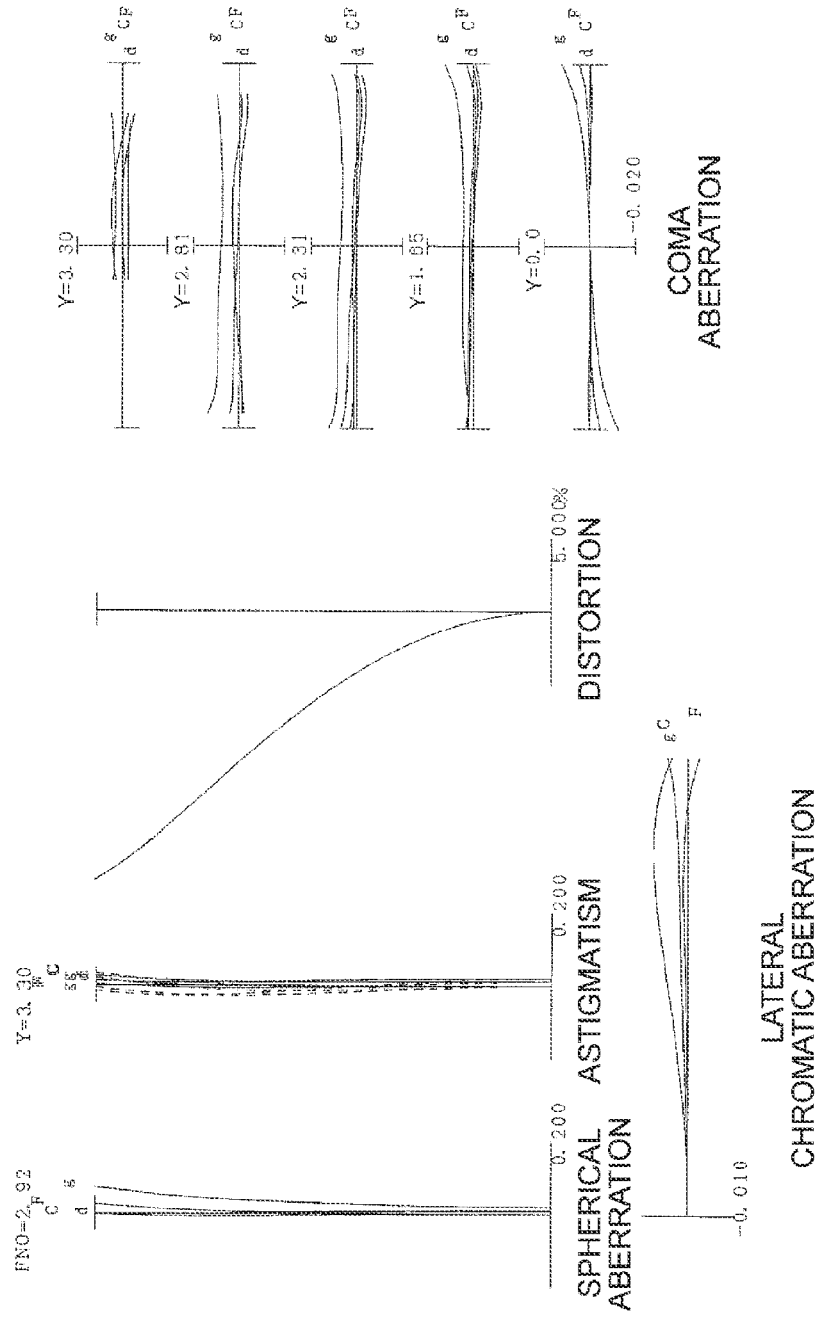
FIG. 6 is a set of graphs showing various aberrations of the zoom lens according to Example 2 upon focusing on infinity in the wide-angle end state.
Figure 7A:
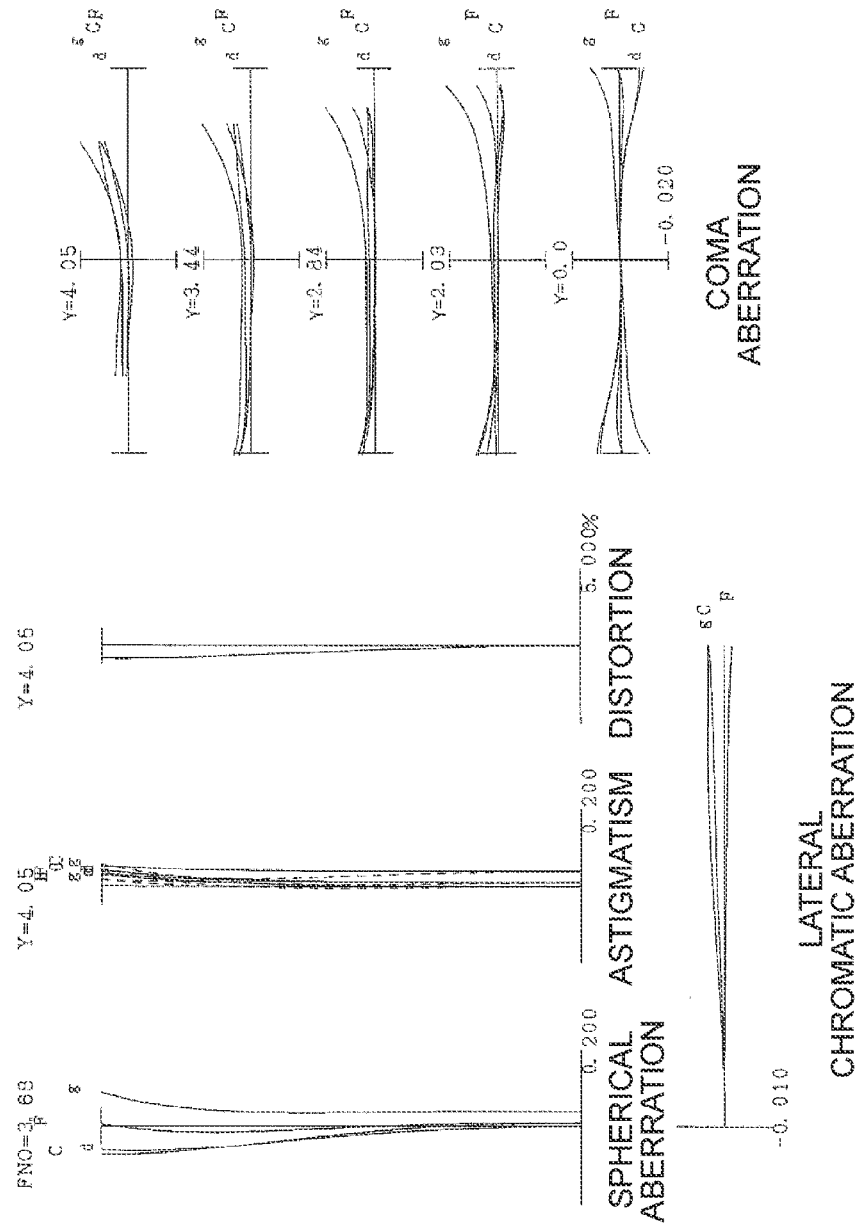
FIG. 7A is a set of graphs showing various aberrations of the zoom lens upon focusing on infinity in a first intermediate focal length state.
Figure 7B:
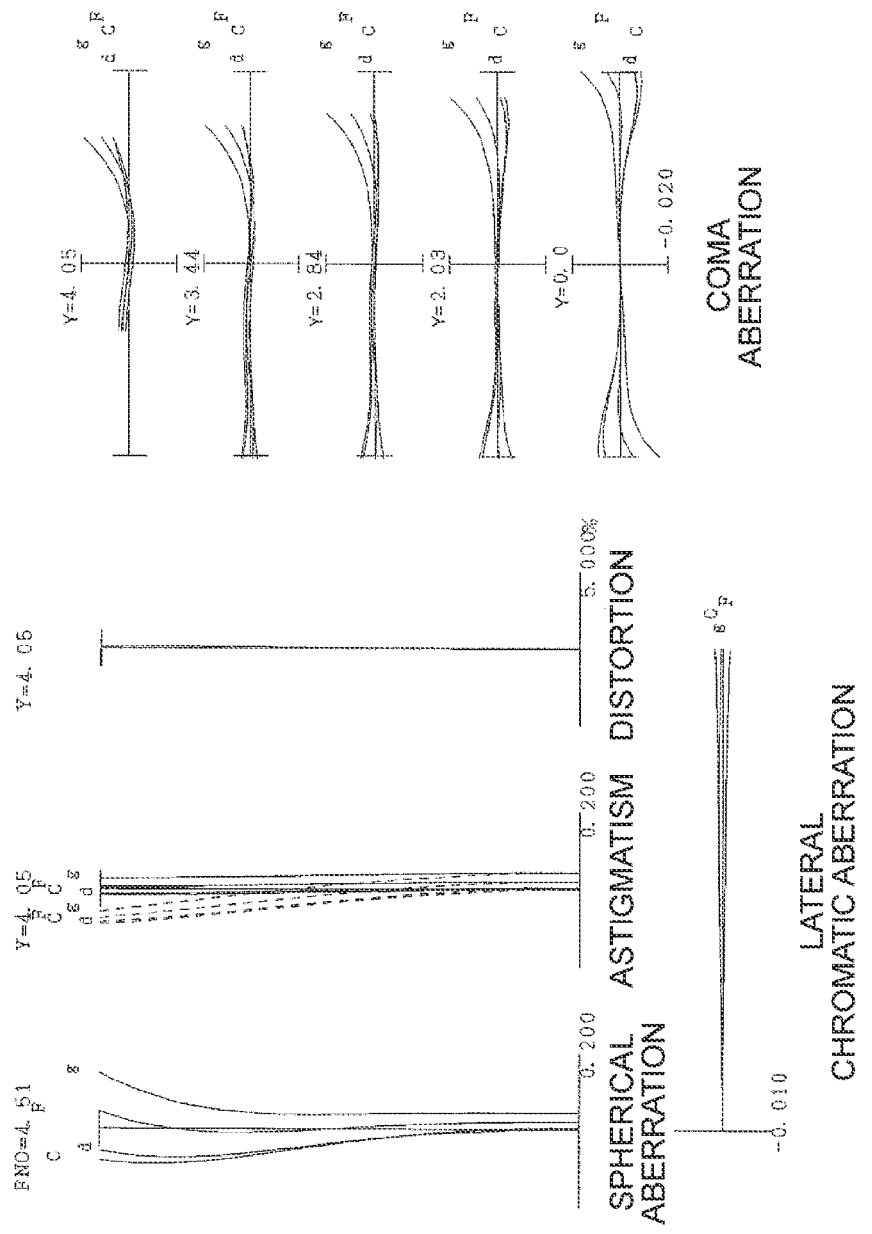
FIG. 7B is a set of graphs showing various aberrations of the zoom lens upon focusing on infinity in a second intermediate focal length state.
Figure 7C:
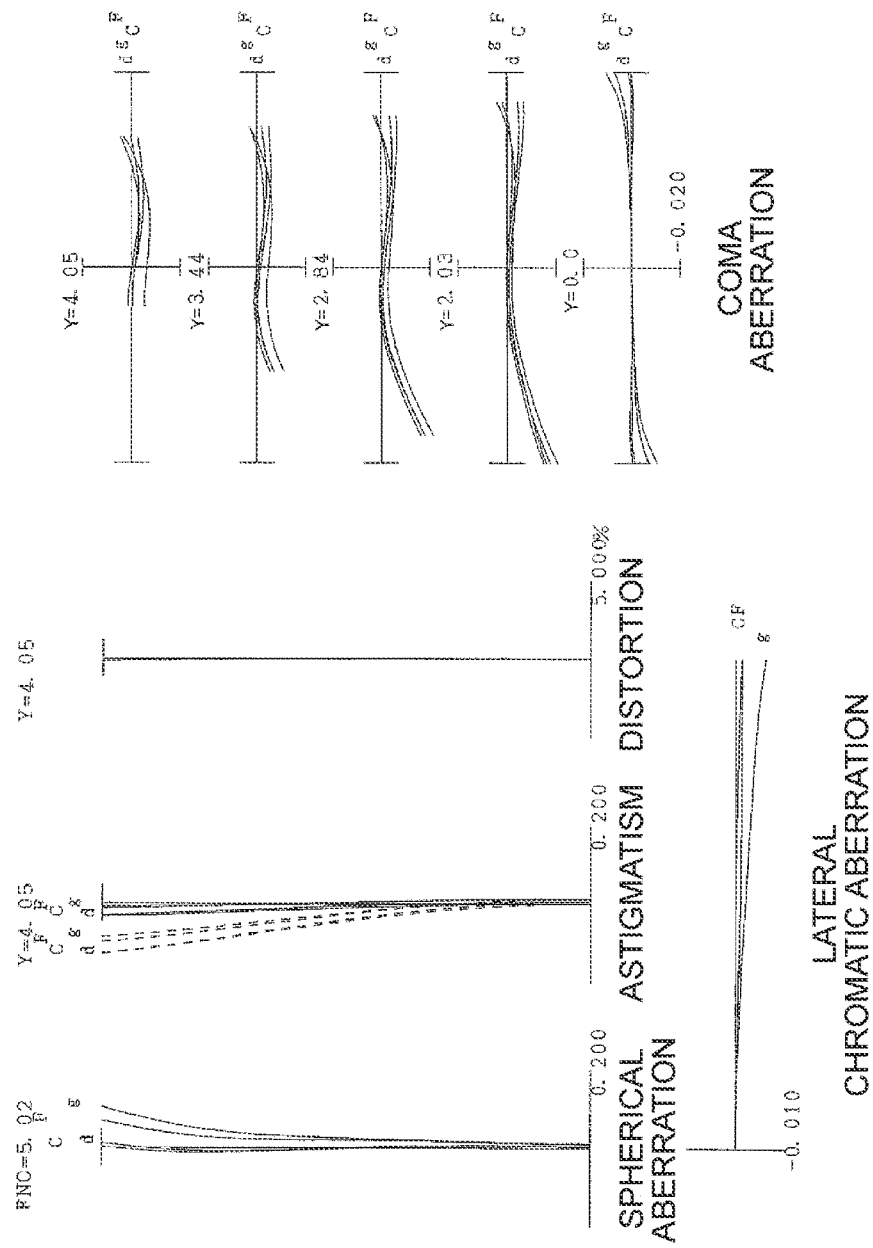
FIG. 7C is a set of graphs showing various aberrations of the zoom lens upon focusing on infinity in a third intermediate focal length state.
Figure 8:
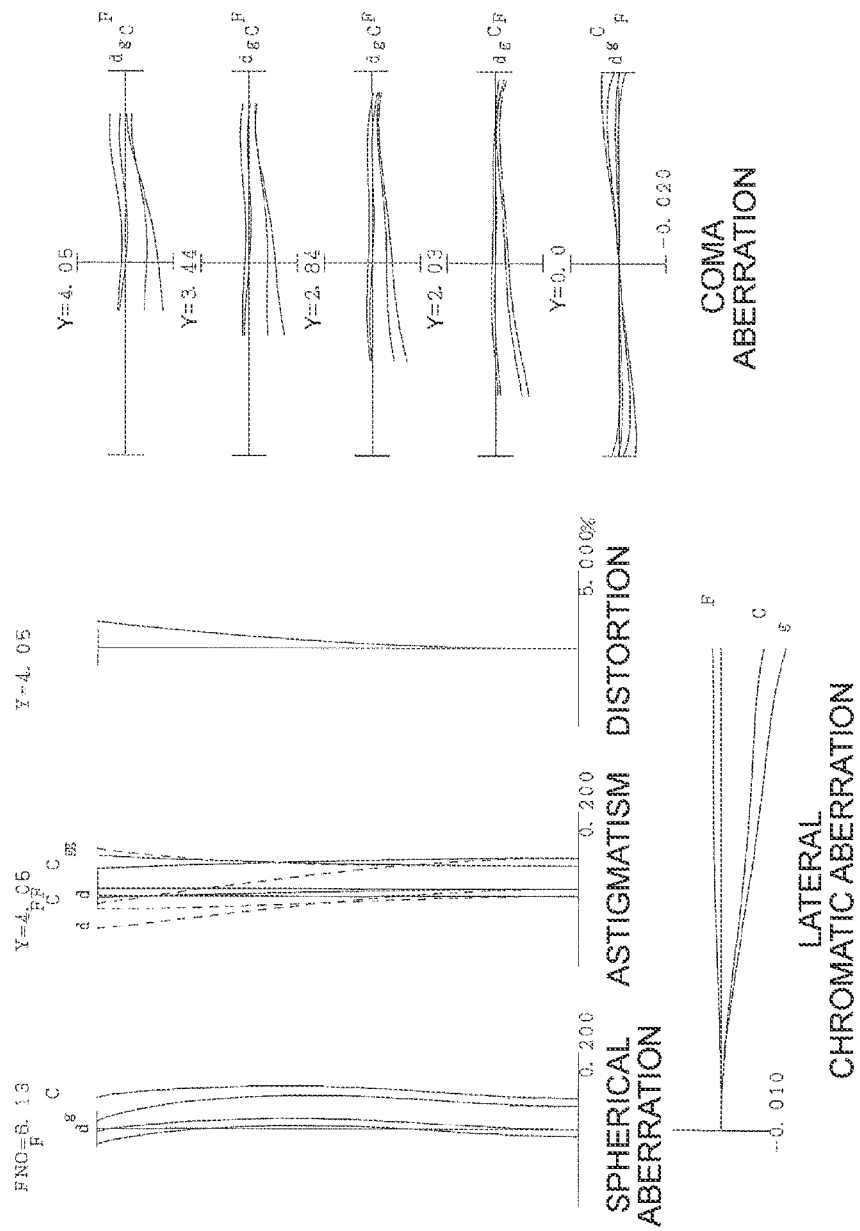
FIG. 8 is a set of graphs showing various aberrations of the zoom lens according to Example 2 upon focusing on infinity in the telephoto end state.

FIG. 6 to FIG. 8 are graphs showing various aberrations of the zoom lens ZL2 according to Example 2. Here FIG. 6 is a set of graphs showing various aberrations upon focusing on infinity in the wide-angle end state. FIG. 7A is a set of graphs showing various aberrations upon focusing on infinity in a first intermediate focal length state (intermediate position 1), FIG. 7B is a set of graphs showing various aberrations upon focusing on infinity in a second intermediate focal length state (intermediate position 2), and FIG. 7C is a set of graphs showing various aberrations upon focusing on infinity in the third intermediate focal length state (intermediate position 3). FIG. 8 is a set of graphs showing various aberrations upon focusing on infinity in a telephoto end state.

As each graph showing aberrations clarifies, in Example 2, various aberrations are satisfactorily corrected in each focal length state from the wide-angle end state to the telephoto end state, demonstrating excellent image forming performance.

Example 3

Figure 9:
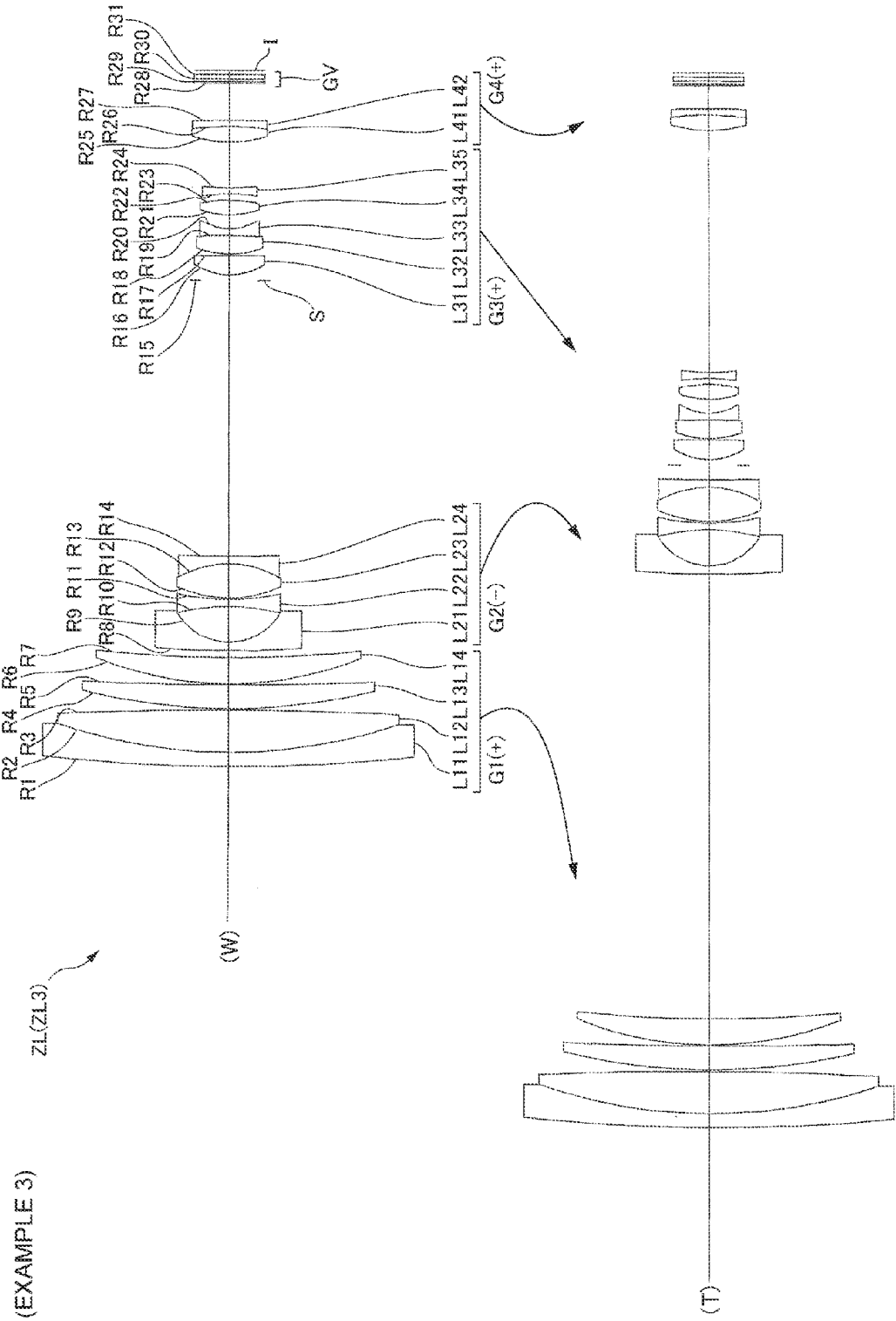
FIG. 9 shows a configuration of a zoom lens according to Example 3 and a zoom locus from a wide-angle end state (W) to a telephoto end state (T)

Example 3 will be described with reference to FIG. 9 to FIG. 12 and Table 3. FIG. 9 shows a configuration of a zoom lens ZL (ZL3) according to Example 3, and a zoom locus from a wide-angle end state (W) to a telephoto end state (T). As FIG. 9 shows, the zoom lens ZL3 according to Example 3 includes, in order from an object, a first lens group G1 having positive refractive power, a second lens group G2 having negative refractive power, an aperture stop S used for adjusting the quantity of light, a third lens group G3 having positive refractive power, and a fourth lens group G4 having positive refractive power.

The first lens group G1 includes, in order from the object, a cemented lens of a negative lens L11 in a meniscus form having a convex surface facing the object and a positive lens L12 in a biconvex form, a first positive lens L13 in a meniscus form having a convex surface facing the object, and a second positive lens L14 in a meniscus form having a convex surface facing the object.

The second lens group G2 includes, in order from the object, a first negative lens L21 in a meniscus form having a convex surface facing the object, a second negative lens L22 in a biconcave form, and a cemented positive lens of a positive lens L23 in a biconvex form and a negative lens L24 in a biconcave form.

The third lens group G3 includes, in order from the object, a first positive lens L31 in a biconvex form, a negative cemented lens of a positive lens L32 in a biconvex form and a negative lens L33 in a biconcave form, a second positive lens L34 in a biconvex form, and a negative lens L35 in a biconcave form.

The fourth lens group G4 includes a cemented lens of a positive lens L41 in a biconvex form and a negative lens L42 in a meniscus form having a convex surface facing the image plane I.

The aperture stop S for determining brightness is disposed near the object side of the third lens group G3, and moves together with the third lens group G3 upon zooming from the wide-angle end state to the telephoto end state. Between the fourth lens group G4 and the image plane I, a glass block GV, such as a low pass filter or an infrared cut-off filter, for cutting a spatial frequency exceeding the critical resolution of a solid-state picture element C (e.g. CCD, CMOS) disposed on the image plane I, is disposed.

In the zoom lens ZL3 having this configuration, all four lens groups G1 to G4 move upon zooming from the wide-angle end state to the telephoto end state. The first lens group G1 moves toward the image plane I first and then moves toward the object upon zooming. The second lens group G2 moves toward the image plane I first and then moves toward the object upon zooming. The third lens group G3 moves toward the object upon zooming. The fourth lens group G4 moves toward the object first and then moves toward the image plane I upon zooming. The aperture stop S used for adjusting the quantity of light moves together with the third lens group G3 upon zooming.

Table 3 shows each data value of Example 3. The radius of curvature R of surface 1 to surface 31 in Table 3 correspond to numerals R1 to R31 attached to surface 1 to surface 31 in FIG. 9. In Example 3, surfaces 16, 17, 21 and 22 are aspherical.

TABLE 3

| [Lens Data] | | | | |
|---|---|---|---|---|
| Surface number | R | D | nd | vd |
| Object surface | ∞ | | | |
| 1 | 227.6993 | 1.8000 | 1.910822 | 35.25 |
| 2 | 67.7805 | 5.5000 | 1.497820 | 82.57 |
| 3 | −462.0134 | 0.2000 | | |
| 4 | 79.2518 | 3.1000 | 1.593190 | 67.90 |
| 5 | 469.5092 | 0.1000 | | |
| 6 | 45.4477 | 3.4000 | 1.497820 | 82.57 |
| 7 | 163.8389 | D7 | | |
| 8 | 128.1731 | 1.1000 | 1.883000 | 40.66 |
| 9 | 7.8146 | 4.6200 | | |
| 10 | −26.5827 | 0.9000 | 1.772500 | 49.62 |
| 11 | 31.5337 | 0.2000 | | |
| 12 | 16.3913 | 4.0000 | 1.805180 | 25.45 |
| 13 | −13.3349 | 1.0000 | 1.883000 | 40.66 |
| 14 | 255.5415 | D14 | | |
| 15 (aperture stop) | ∞ | 0.7500 | | |
| *16 (aspherical) | 8.1123 | 2.5000 | 1.592014 | 67.02 |
| *17 (aspherical) | −479.6573 | 0.2000 | | |
| 18 | 12.1924 | 2.4000 | 1.497820 | 82.57 |
| 19 | −97.0365 | 0.9000 | 1.834000 | 37.18 |
| 20 | 6.8185 | 1.8000 | | |
| *21 (aspherical) | 11.3879 | 1.9000 | 1.693500 | 53.20 |
| *22 (aspherical) | −17.3247 | 0.8000 | | |
| 23 | −25.9239 | 0.8000 | 1.834810 | 42.73 |

TABLE 3-continued

| | | | | |
|---|---|---|---|---|
| 24 | 29.4116 | D24 | | |
| 25 | 17.1867 | 2.0000 | 1.487490 | 70.32 |
| 26 | −39.1837 | 0.8000 | 1.801000 | 34.92 |
| 27 | −186.1871 | D27 | | |
| 28 | ∞ | 0.2100 | 1.516800 | 63.88 |
| 29 | ∞ | 0.3900 | | |
| 30 | ∞ | 0.5000 | 1.516800 | 63.88 |
| 31 | ∞ | Bf | | |
| Image plane | ∞ | | | |

[Aspherical Data]

Surface 16

$\kappa = 0.9781$, A4 = −1.13492E−04, A6 = −1.50547E−06, A8 = 0.00000E+00, A10 = 0.00000E+00

Surface 17

$\kappa = 1.0000$, A4 = 1.30617E−06, A6 = 6.66535E−07, A8 = 0.00000E+00, A10 = 0.00000E+00

Surface 21

$\kappa = -0.7035$, A4 = −1.60639E−05, A6 = 9.72826E−06, A8 = 2.94596E−08, A10 = 0.00000E+00

Surface 22

$\kappa = 3.9454$, A4 = 7.38192E−05, A6 = 1.10077E−05, A8 = 0.00000E+00, A10 = 0.00000E+00

[General Data]
Zoom ratio 43.531

| | Wide-angle end | Intermediate position 1 | Intermediate position 2 | Intermediate position 3 | Telephoto end |
|---|---|---|---|---|---|
| f | 4.04999 | 10.79998 | 27.00005 | 68.80017 | 176.29984 |
| FNo | 2.91874 | 3.71182 | 4.50821 | 5.00673 | 6.10493 |
| ω | 46.56059 | 20.77613 | 8.53607 | 3.38091 | 1.29844 |
| Y | 7.00000 | 7.80000 | 7.80000 | 7.80000 | 7.80000 |
| TL | 90.24797 | 92.63187 | 109.54185 | 125.11445 | 136.80022 |
| Bf | 0.52998 | 0.52995 | 0.52991 | 0.52988 | 0.52983 |
| Bf(air conversion) | 6.22136 | 12.71472 | 21.37572 | 25.87575 | 4.38944 |

[Zooming Data]

| Variable distance | Wide-angle end | Intermediate position 1 | Intermediate position 2 | Intermediate position 3 | Telephoto end |
|---|---|---|---|---|---|
| D7 | 0.90000 | 15.68436 | 33.48573 | 49.02590 | 57.66331 |
| D14 | 35.76116 | 15.85696 | 7.76920 | 3.30159 | 1.85000 |
| D24 | 5.95353 | 6.96392 | 5.49930 | 5.49930 | 31.48557 |
| D27 | 4.83329 | 11.32668 | 19.98772 | 24.48778 | 3.00152 |

[Zoom Lens Group Data]

| Group number | First surface of group | Group focal length | Lens configuration length |
|---|---|---|---|
| G1 | 1 | 75.59884 | 14.1 |
| G2 | 8 | −7.93329 | 12.22 |
| G3 | 16 | 16.95464 | 12.05 |
| G4 | 25 | 40.37616 | 2.8 |

[Conditional Expressions]

Conditional expression (1) (−f2)/fw = 1.959
Conditional expression (2) νdp1 = 82.57
Conditional expression (3) (−f2)/ft = 0.045
Conditional expression (4) f1/ft = 0.429

As the data in Table 3 shows, the zoom lens ZL3 according to Example 3 satisfies all of the conditional expressions (1) to (4).

Figure 10:
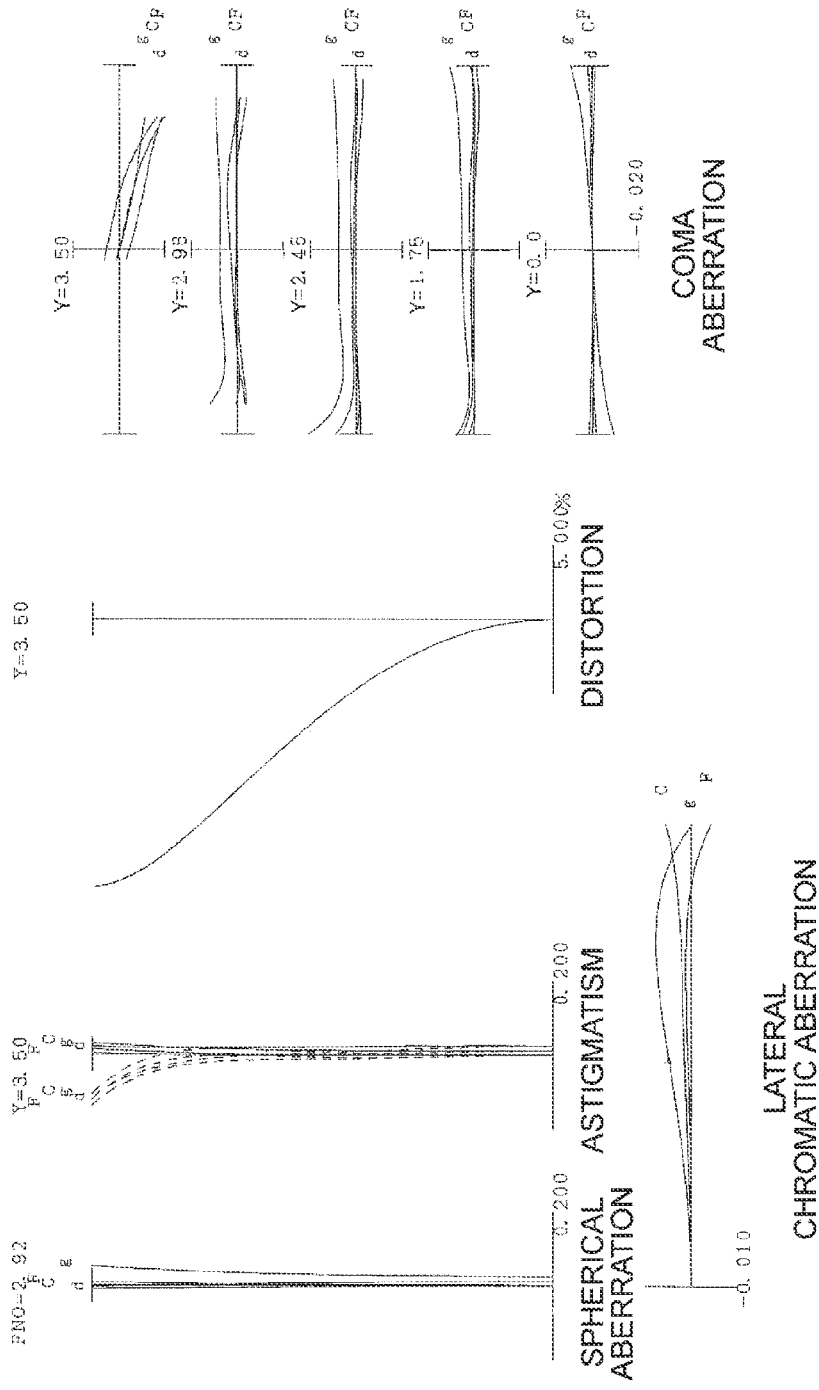
FIG. 10 is a set of graphs showing various aberrations of the zoom lens according to Example 3 upon focusing on infinity in the wide-angle end state.
Figure 11A:
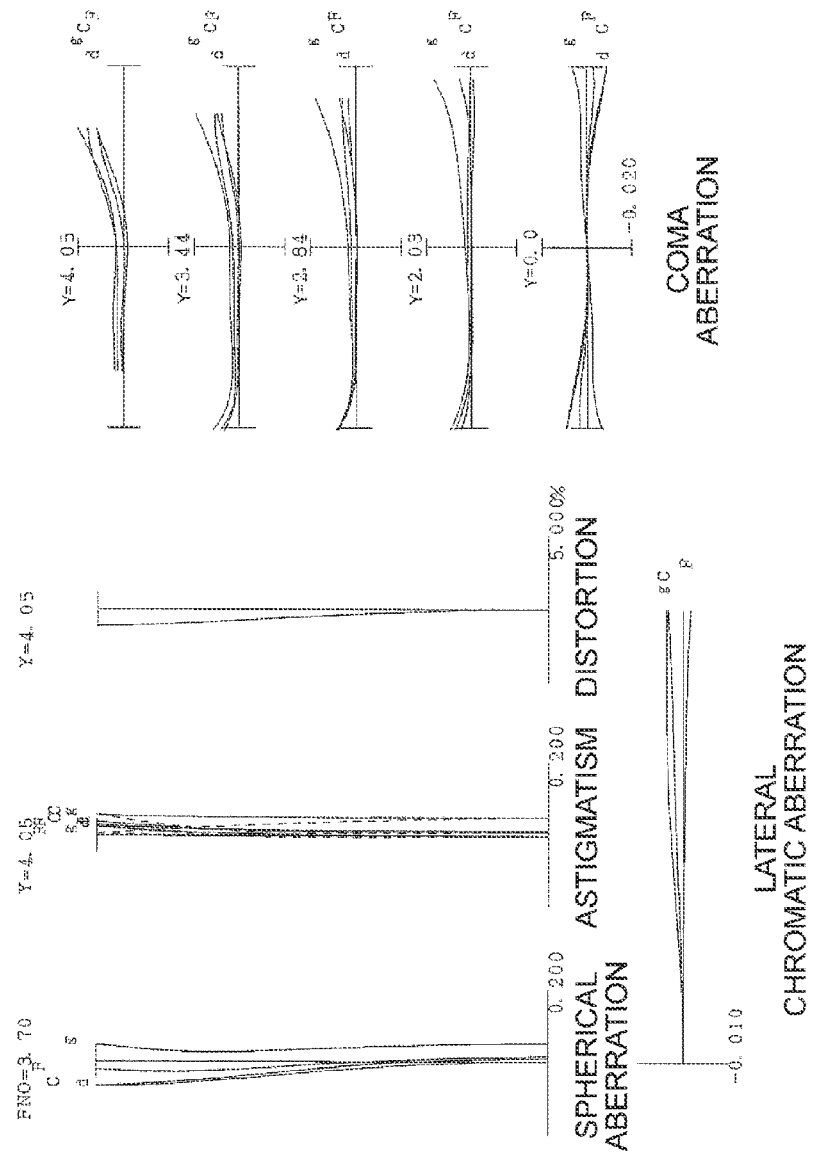
FIG. 11A is a set of graphs showing various aberrations of the zoom lens upon focusing on infinity in a first intermediate focal length state.
Figure 11B:
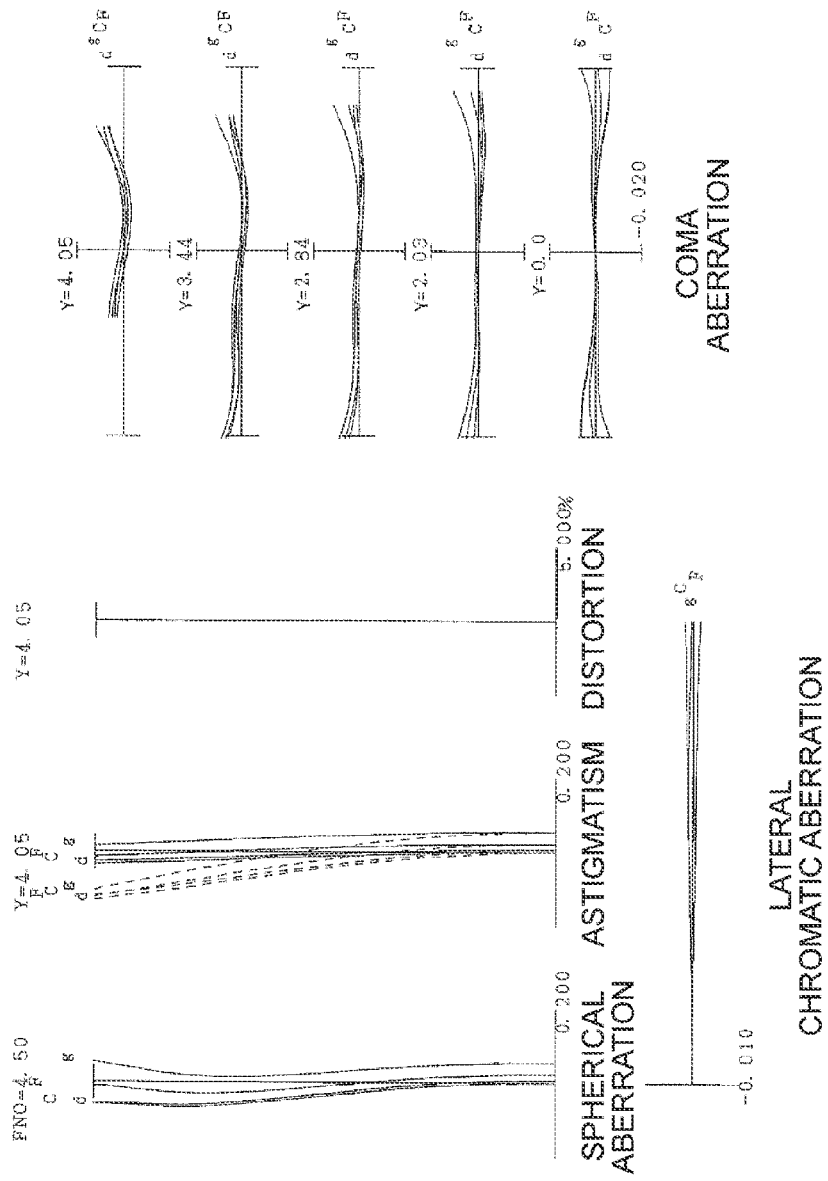
FIG. 11B is a set of graphs showing various aberrations of the zoom lens upon focusing on infinity in a second intermediate focal length state.
Figure 11C:
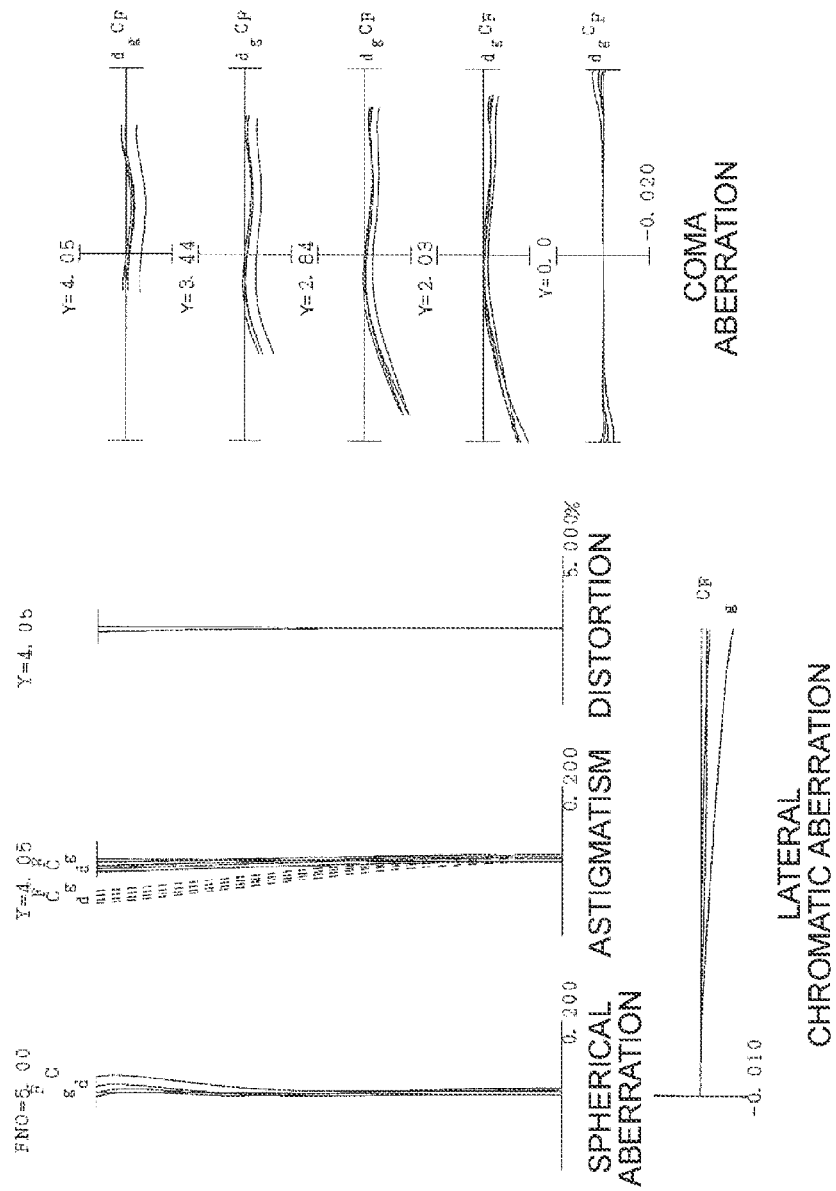
FIG. 11C is a set of graphs showing various aberrations of the zoom lens upon focusing on infinity in a third intermediate focal length state.
Figure 12:
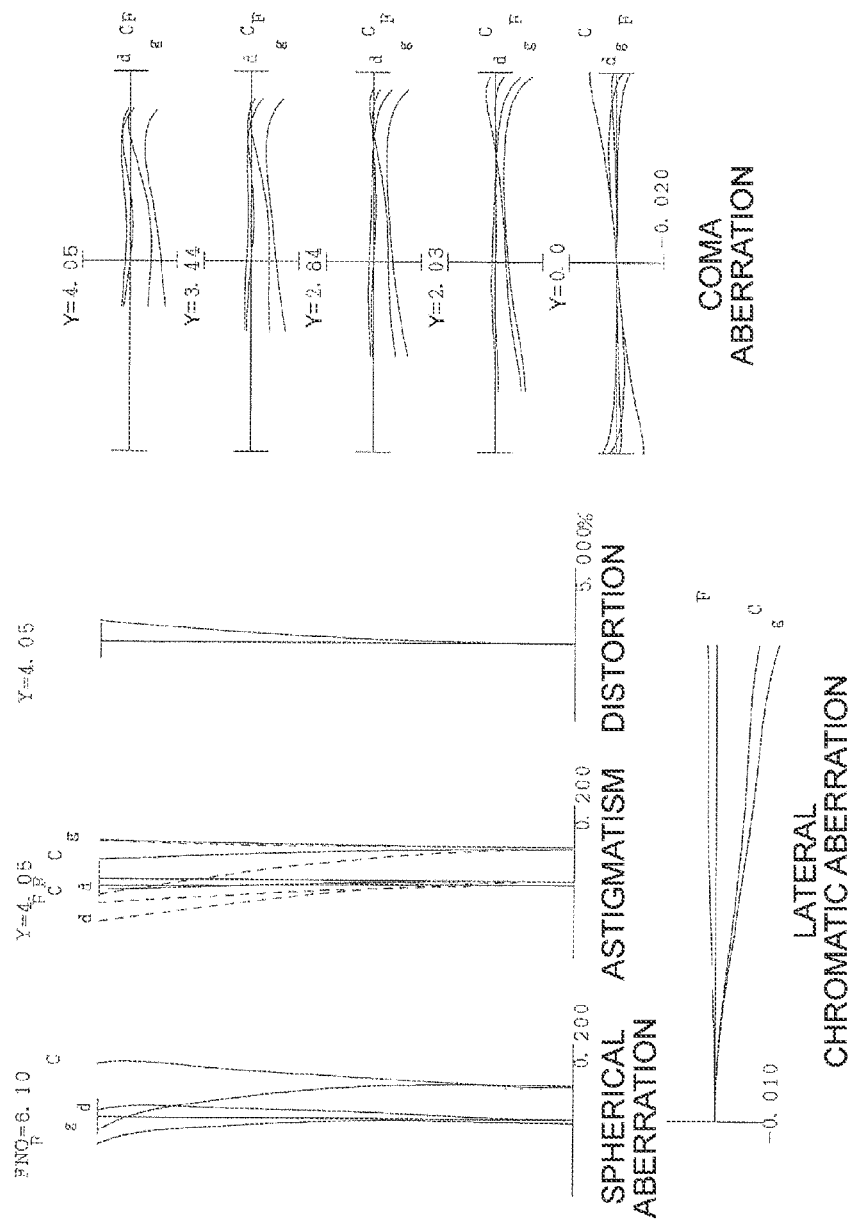
FIG. 12 is a set of graphs showing various aberrations of the zoom lens according to Example 3 upon focusing on infinity in the telephoto end state.

FIG. 10 to FIG. 12 are graphs showing various aberrations of the zoom lens ZL3 according to Example 3. Here FIG. 10 is a set of graphs showing various aberrations upon focusing on infinity in the wide-angle end state. FIG. 11A is a set of graphs showing various aberrations upon focusing on infinity in a first intermediate focal length state (intermediate position 1), FIG. 11B is a set of graphs showing various aberrations upon focusing on infinity in a second intermediate focal length state (intermediate position 2), and FIG. 11C is a set of graphs showing various aberrations upon focusing on infinity in the third intermediate focal length state (intermediate position 3). FIG. 12 is a set of graphs showing various aberrations upon focusing on infinity in a telephoto end state.

As each graph showing aberrations clarifies, in Example 3, various aberrations are satisfactorily corrected in each focal length state from the wide-angle end state to the telephoto end state, demonstrating excellent image forming performance.

Example 4

Figure 13:
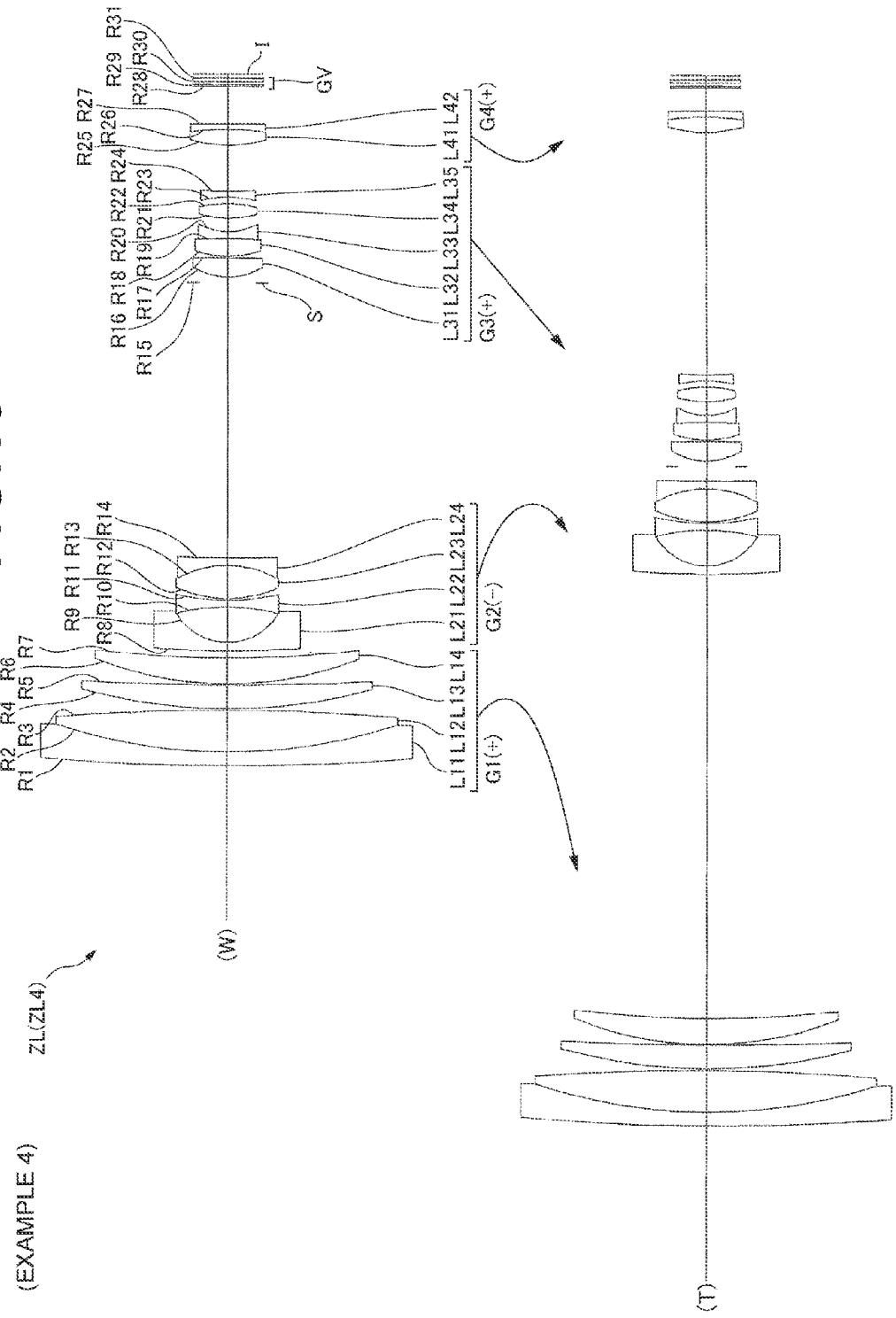
FIG. 13 shows a configuration of a zoom lens according to Example 4 and a zoom locus from a wide-angle end state (W) to a telephoto end state (T)

Example 4 will be described with reference to FIG. 13 to FIG. 16 and Table 4. FIG. 13 shows a configuration of a zoom lens ZL (ZL4) according to Example 4, and a zoom locus from a wide-angle end state (W) to a telephoto end state (T). As FIG. 13 shows, the zoom lens ZL4 according to Example 4 includes, in order from an object, a first lens group G1 having positive refractive power, a second lens group G2 having negative refractive power, an aperture stop S used for adjusting the quantity of light, a third lens group G3 having positive refractive power, and a fourth lens group G4 having positive refractive power.

The first lens group G1 includes, in order from the object, a cemented lens of a negative lens L11 in a meniscus form having a convex surface facing the object and a positive lens L12 in a biconvex form, a first positive lens L13 in a meniscus form having a convex surface facing the object, and a second positive lens L14 in a meniscus form having a convex surface facing the object.

The second lens group G2 includes, in order from the object, a first negative lens L21 in a meniscus form having a convex surface facing the object, a second negative lens L22 in a biconcave form, and a cemented positive lens of a positive lens L23 in a biconvex form and a negative lens L24 in a biconcave form.

The third lens group G3 includes, in order from the object, a first positive lens L31 in a biconvex form, a negative cemented lens of a positive lens L32 in a biconvex form and a negative lens L33 in a biconcave form, a second positive lens L34 in a biconvex form, and a negative lens L35 in a biconcave form.

The fourth lens group G4 includes a cemented lens of a positive lens L41 in a biconvex form and a negative lens L42 in a meniscus form having a convex surface facing the image plane I.

The aperture stop S for determining brightness is disposed near the object side of the third lens group G3, and moves together with the third lens group G3 upon zooming from the wide-angle end state to the telephoto end state. Between the fourth lens group G4 and the image plane I, a glass block GV, such as a low pass filter or an infrared cut-off filter, for cutting a spatial frequency exceeding the critical resolution of a solid-state picture element C (e.g. CCD, CMOS) disposed on the image plane I, is disposed.

In the zoom lens ZL4 having this configuration, all four lens groups G1 to G4 move upon zooming from the wide-angle end state to the telephoto end state. The first lens group G1 moves toward the image plane I first and then moves toward the object upon zooming. The second lens group G2 moves toward the image plane I first and then moves toward the object upon zooming. The third lens group G3 moves toward the object upon zooming. The fourth lens group G4 moves toward the object first and then moves toward the image plane I upon zooming. The aperture stop S used for adjusting the quantity of light moves together with the third lens group G3 upon zooming.

Table 4 shows each data value of Example 4. The radius of curvature R of surface 1 to surface 31 in Table 4 correspond to numerals R1 to R31 attached to surface 1 to surface 31 in FIG. 13. In Example 4, surfaces 16, 17, 21 and 22 are aspherical.

TABLE 4

[Lens Data]

| Surface number | R | D | nd | vd |
| --- | --- | --- | --- | --- |
| Object surface | ∞ | | | |
| 1 | 285.0493 | 1.8000 | 1.910822 | 35.25 |
| 2 | 71.6540 | 5.4000 | 1.497820 | 82.57 |
| 3 | −297.4587 | 0.2000 | | |
| 4 | 71.6702 | 3.1000 | 1.593190 | 67.90 |
| 5 | 377.8910 | 0.1000 | | |
| 6 | 46.5321 | 3.4000 | 1.497820 | 82.57 |
| 7 | 144.6600 | D7 | | |
| 8 | 126.0732 | 1.1000 | 1.883000 | 40.66 |
| 9 | 7.7618 | 4.6200 | | |
| 10 | −26.4844 | 0.9000 | 1.772500 | 49.62 |
| 11 | 30.7368 | 0.2000 | | |
| 12 | 16.3094 | 4.3000 | 1.805180 | 25.45 |
| 13 | −13.4488 | 1.0000 | 1.883000 | 40.66 |
| 14 | 317.7485 | D14 | | |
| 15 (aperture stop) | ∞ | 0.7500 | | |
| *16 (aspherical) | 8.3605 | 2.5000 | 1.592014 | 67.02 |
| *17 (aspherical) | −184.1125 | 0.2000 | | |
| 18 | 12.3627 | 2.3000 | 1.497820 | 82.57 |
| 19 | −68.7660 | 0.9000 | 1.834000 | 37.18 |
| 20 | 7.7043 | 1.8000 | | |
| *21 (aspherical) | 14.6432 | 1.9000 | 1.693500 | 53.20 |
| *22 (aspherical) | −14.0058 | 0.8000 | | |
| 23 | −16.2578 | 0.8000 | 1.834810 | 42.73 |
| 24 | 56.4077 | D24 | | |
| 25 | 17.2087 | 2.0000 | 1.487490 | 70.32 |
| 26 | −40.3417 | 0.8000 | 1.801000 | 34.92 |
| 27 | −194.9438 | D27 | | |
| 28 | ∞ | 0.2100 | 1.516800 | 63.88 |
| 29 | ∞ | 0.3900 | | |

TABLE 4-continued

| | | | | |
|---|---|---|---|---|
| 30 | ∞ | 0.5000 | 1.516800 | 63.88 |
| 31 | ∞ | Bf | | |
| Image plane | ∞ | | | |

[Aspherical Data]

Surface 16

κ = 0.3360, A4 = 7.95450E−05, A6 = −7.84311E−07, A8 = 0.00000E+00,
A10 = 0.00000E+00
Surface 17

κ = 1.0000, A4 = 9.09695E−05, A6 = −2.21740E−06, A8 = 0.00000E+00,
A10 = 0.00000E+00
Surface 21

κ = −0.2251, A4 = −7.86911E−06, A6 = 3.34589E−06, A8 = −3.52335E−08,
A10 = 0.00000E+00
Surface 22

κ = −0.5292, A4 = 2.74626E−05, A6 = 5.56682E−06, A8 = 0.00000E+00,
A10 = 0.00000E+00

[General Data]
Zoom ratio 43.531

| | Wide-angle end | Intermediate position 1 | Intermediate position 2 | Intermediate position 3 | Telephoto end |
|---|---|---|---|---|---|
| f | 4.04999 | 10.79998 | 27.00005 | 68.80017 | 176.29984 |
| FNo | 2.91874 | 3.71182 | 4.50821 | 5.00673 | 6.10493 |
| ω | 46.56023 | 20.77681 | 8.53606 | 3.38074 | 1.29845 |
| Y | 7.00000 | 7.80000 | 7.80000 | 7.80000 | 7.80000 |
| TL | 90.02593 | 92.40983 | 109.31981 | 124.89241 | 136.57819 |
| Bf | 0.52998 | 0.52995 | 0.52991 | 0.52988 | 0.52983 |
| Bf (air conversion) | 6.22003 | 12.71338 | 21.37438 | 25.87442 | 4.38811 |

[Zooming Data]

| Variable distance | Wide-angle end | Intermediate position 1 | Intermediate position 2 | Intermediate position 3 | Telephoto end |
|---|---|---|---|---|---|
| D7 | 0.89998 | 15.68434 | 33.48570 | 49.02588 | 57.66328 |
| D14 | 35.76116 | 15.85696 | 7.76920 | 3.30159 | 1.85000 |
| D24 | 6.03285 | 7.04324 | 5.57862 | 5.57862 | 31.56489 |
| D27 | 4.83196 | 11.32534 | 19.98638 | 24.48645 | 3.00019 |

[Zoom Lens Group Data]

| Group number | First surface of group | Group focal length | Lens configuration length |
|---|---|---|---|
| G1 | 1 | 75.59884 | 14.0 |
| G2 | 8 | −7.93329 | 12.12 |
| G3 | 16 | 16.95464 | 11.95 |
| G4 | 25 | 40.37616 | 2.8 |

[Conditional Expressions]

Conditional expression (1) (−f2)/fw = 1.959
Conditional expression (2) νdp1 = 82.57
Conditional expression (3) (−f2)/ft = 0.045
Conditional expression (4) f1/ft = 0.429

As the data in Table 4 shows, the zoom lens ZL4 according to Example 4 satisfies all of the conditional expressions (1) to (4).

Figure 14:
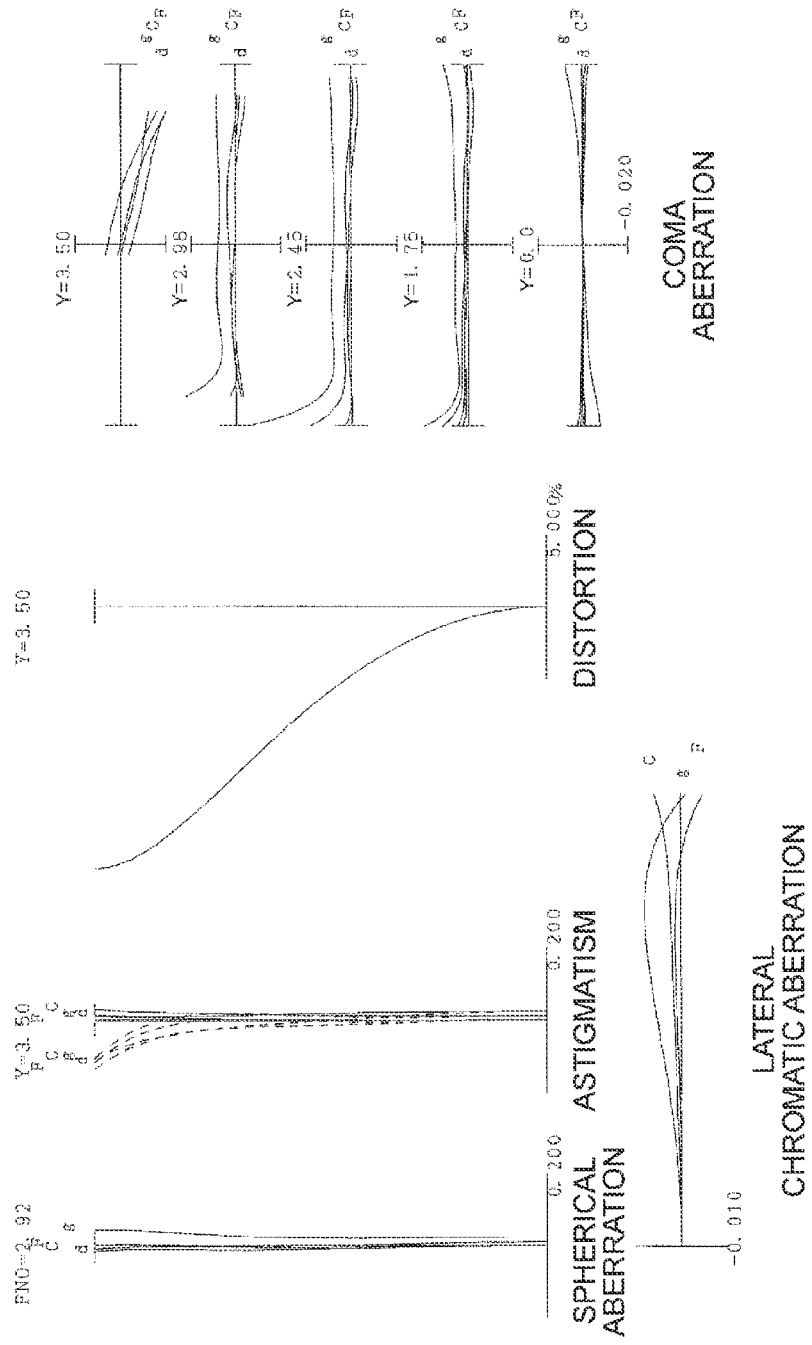
FIG. 14 is a set of graphs showing various aberrations of the zoom lens according to Example 4 upon focusing on infinity in the wide-angle end state.
Figure 15A:
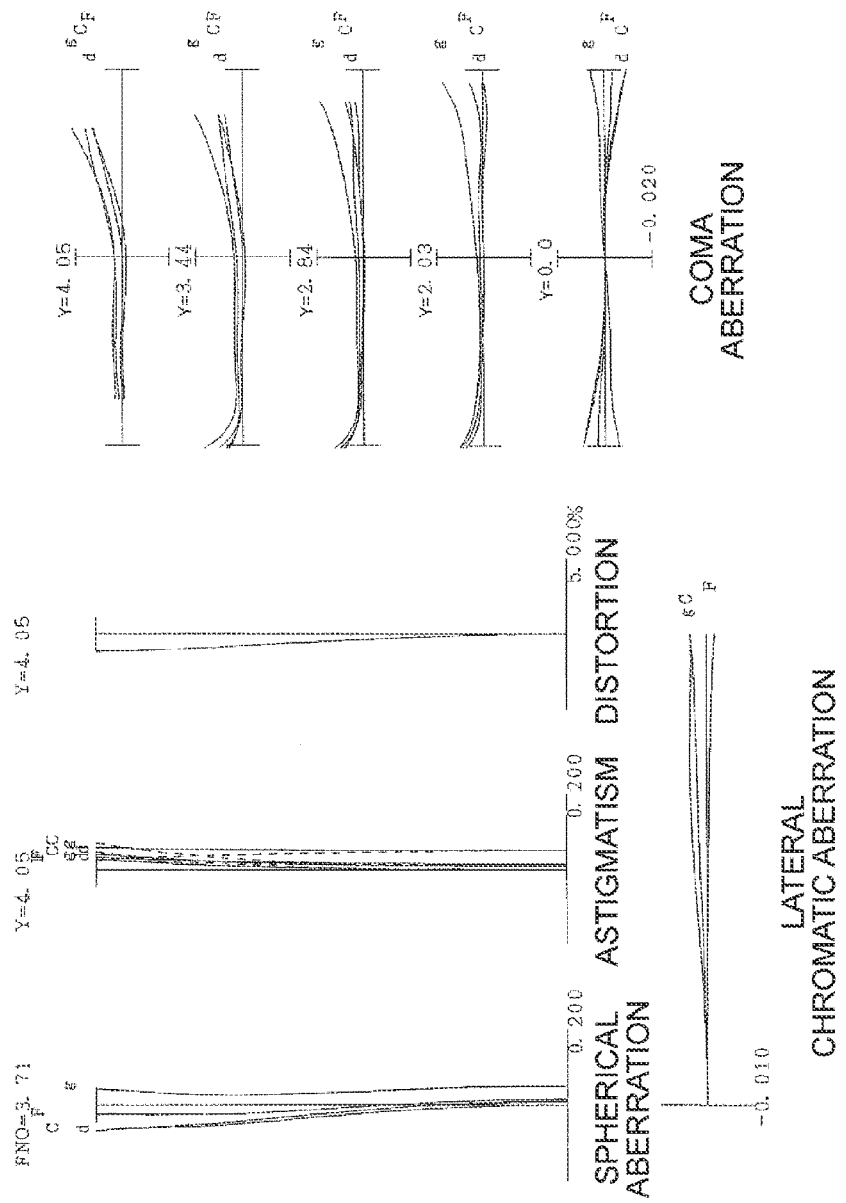
FIG. 15A is a set of graphs showing various aberrations of the zoom lens upon focusing on infinity in a first intermediate focal length state.
Figure 15B:
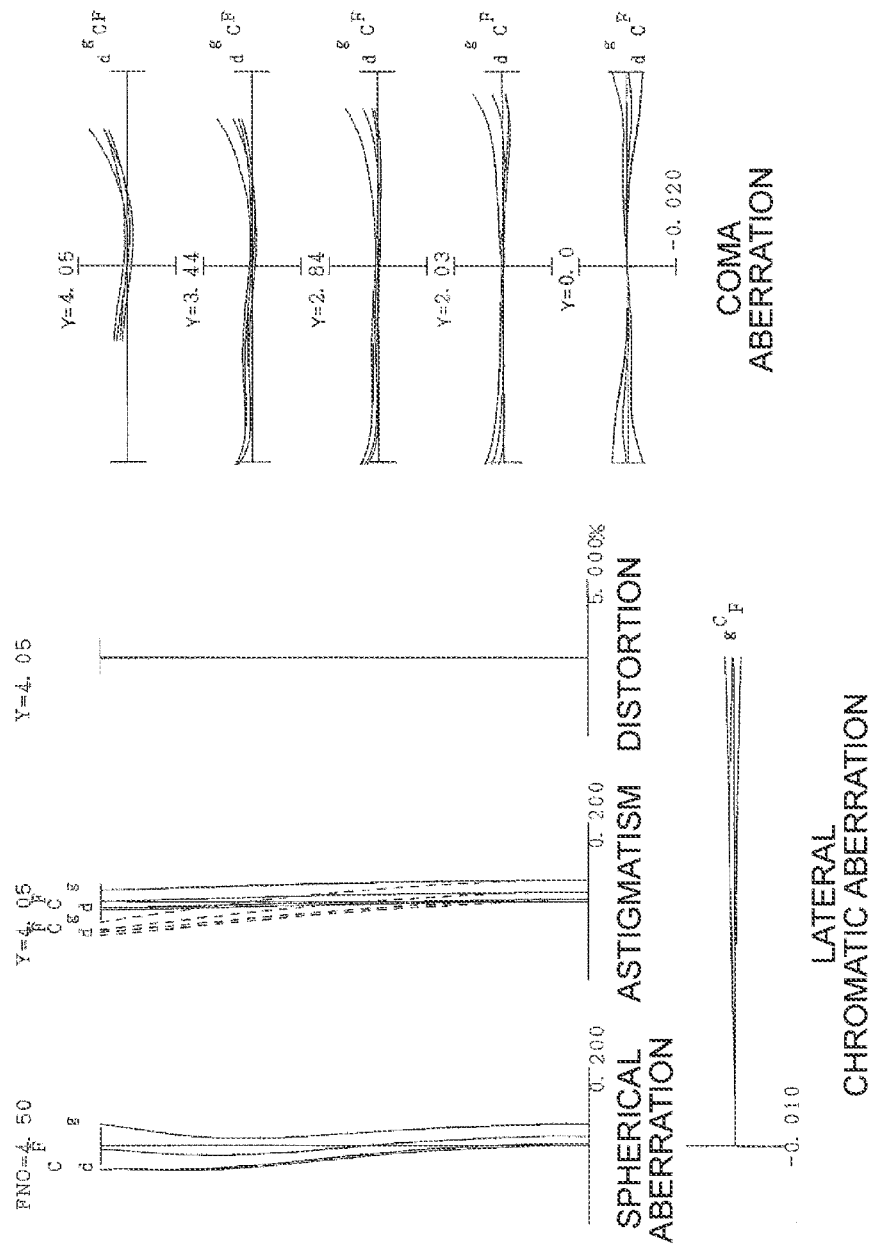
FIG. 15B is a set of graphs showing various aberrations of the zoom lens upon focusing on infinity in a second intermediate focal length state.
Figure 16:
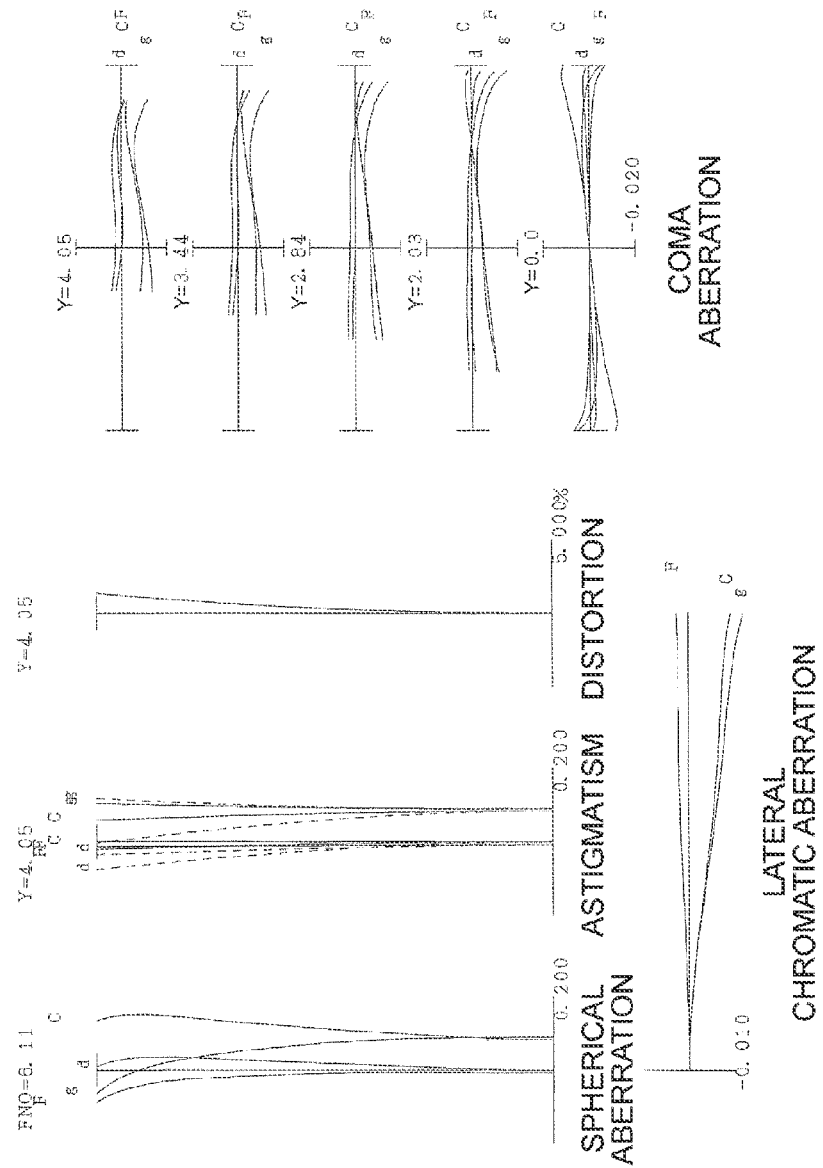
FIG. 16 is a set of graphs showing various aberrations of the zoom lens according to Example 4 upon focusing on infinity in the telephoto end state.

FIG. 14 to FIG. 16 are graphs showing various aberrations of the zoom lens ZL4 according to Example 4. Here FIG. 14 is a set of graphs showing various aberrations upon focusing on infinity in the wide-angle end state. FIG. 15A is a set of graphs showing various aberrations upon focusing on infinity in a first intermediate focal length state (intermediate position 1), FIG. 15B is a set of graphs showing various aberrations upon focusing on infinity in a second intermediate focal length state (intermediate position 2), and FIG. 15C is a set of graphs showing various aberrations upon focusing on infinity in the third intermediate focal length state (intermediate position 3). FIG. 16 is a set of graphs showing various aberrations upon focusing on infinity in a telephoto end state.

As each graph showing aberrations clarifies, in Example 4, various aberrations are satisfactorily corrected in each focal length state from the wide-angle end state to the telephoto end state, demonstrating excellent image forming performance.

As described above, according to each example, a zoom lens and an optical apparatus (digital still camera) that are suitable for a video camera, an electronic still camera or the like using a solid-state picture element, and that have a larger zoom ratio compared with prior arts and have small size and high image quality, can be implemented.

In the above embodiments, the following content can be adopted within a range where the optical performance is not diminished.

In each example, the zoom lens is constituted by four lens groups, but the present invention can also be applied to a configuration using a different number of lens groups, such as five lens groups or six lens groups. In the configuration, a lens or a lens group may be added to the side closest to the object, or a lens or a lens group may be added to the side closest to the image. A "lens group" refers to a portion having at least one lens isolated by an air gap which changes upon zooming.

A single or a plurality of lens groups or a partial lens group may be designed to be a focusing lens group, which performs focusing from an object at infinity to an object at a short distance by moving in the optical axis direction. This focusing lens group can be applied to auto focus, and is also suitable for driving a motor for auto focusing (driving using an ultrasonic motor). It is particularly preferable that at least a part of the fourth lens group is designed to be a focusing lens group.

Further, a lens group or a partial lens group may be designed to be a vibration-isolating lens group, which corrects image blurs generated by camera shaking by moving the lens group or the partial lens group in a direction perpendicular to the optical axis, or by rotating (oscillating) the lens group or the partial lens group in an in-plane direction including the optical axis. It is particularly preferable that at least a part of the third lens group is designed to be a vibration-isolating lens group. It is even better if the second positive lens and the negative lens on the image side of the third lens group are designed to be a vibration-isolating lens group.

The lens surface may be formed to be a spherical surface or a plane, or an aspherical surface. If the lens surface is a spherical surface or a plane, lens processing, assembly and adjustment are easy, and deterioration of optical performance, due to an error in processing, assembly and adjustment, can be prevented. Even if the image plane deviates, the writing performance does not change much. If the lens surface is an aspherical surface, the aspherical surface can be any aspherical surface out of an aspherical surface generated by grinding, a glass-molded aspherical surface generated by forming glass in an aspherical shape using a die, and a composite aspherical surface generated by forming resin on the surface of the glass so as to be an aspherical shape. The lens surface may be a diffraction surface, and the lens may be a refractive index distributed lens (GRIN lens) or a plastic lens.

It is preferable that the aperture stop is disposed between the second lens group and the fourth lens group, but the role of the aperture stop may be substituted by the frame of the lens, without disposing a separate element as the aperture stop.

Each lens surface may be coated with an antireflection film, which has high transmittance in a wide wavelength region, in order to decrease ghosts and flares, and implement a high optical performance at high contrast.

The zoom ratio of the zoom lens (zoom optical system) of this embodiment is about 10 to 60.

Explanation of Numerals and Characters
ZL (ZL1 to ZL4) zoom lens
G1 first lens group
G2 second lens group
G3 third lens group
G4 fourth lens group
GV glass block
S aperture stop
C solid-state picture element
I image plane
CAM digital still camera (optical apparatus)

The invention claimed is:

1. A zoom lens comprising, in order from an object:
a first lens group having positive refractive power;
a second lens group having negative refractive power;
a third lens group having positive refractive power; and
a fourth lens group having positive refractive power,
the following conditional expression being satisfied:

$$1.90 < (-f2)/fw < 3.00$$

where f2 denotes a focal length of the second lens group, and
fw denotes a focal length of the zoom lens in a wide-angle end state, and
the following conditional expression being satisfied:

$$0.005 < (-f2)/ft < 0.048$$

where ft denotes a focal length of the zoom lens in a telephoto end state.

2. The zoom lens according to claim 1, wherein the following conditional expression is satisfied:

$$70.00 < vdp1$$

where vdp1 denotes an Abbe number of a closest positive lens of the first lens group to an image plane.

3. The zoom lens according to claim 1, wherein the following conditional expression is satisfied:

$$0.05 < f1/ft < 0.50$$

where f1 denotes a focal length of the first lens group, and
ft denotes a focal length of the zoom lens in the telephoto end state.

4. The zoom lens according to claim 1, wherein the first lens group includes, in order from the object, a cemented lens of a negative lens and a positive lens, a first positive lens and a second positive lens.

5. The zoom lens according to claim 1, wherein the first lens group, the second lens group, the third lens group and the fourth lens group move along an optical axis respectively, upon zooming.

6. The zoom lens according to claim 1, wherein the second lens group moves toward an image plane along an optical axis, and then moves toward the object, upon zooming.

7. The zoom lens according to claim 1, wherein the fourth lens group moves toward the object along an optical axis, and then moves toward an image plane, upon zooming.

8. The zoom lens according to claim 1, wherein
an aperture stop is disposed between the second lens group and the fourth lens group, and
the aperture stop moves together with the third lens group, upon zooming.

9. The zoom lens according to claim 1, wherein an aperture stop is disposed between the second lens group and the third lens group.

10. The zoom lens according to claim 1, wherein the third lens group includes, in order from the object, a first positive lens, a cemented lens, a second positive lens and a negative lens.

11. The zoom lens according to claim 10, wherein the cemented lens of the third lens group is a cemented lens of a positive lens and a negative lens.

12. The zoom lens according to claim 10, wherein the cemented lens of the third lens group is a cemented lens of a positive lens and a negative lens, in order from the object.

13. The zoom lens according to claim 10, wherein the cemented lens of the third lens group has negative refractive power.

14. The zoom lens according to claim 1, wherein the second lens group includes, in order from the object, a first negative lens, a second negative lens and a cemented lens.

15. The zoom lens according to claim 14, wherein the cemented lens of the second lens group is a cemented lens of a positive lens and a negative lens.

16. The zoom lens according to claim 14, wherein the cemented lens of the second lens group is a cemented lens of a positive lens and a negative lens, in order from the object.

17. The zoom lens according to claim 14, wherein the cemented lens of the second lens group has positive refractive power.

18. The zoom lens according to claim 1, wherein the fourth lens group includes a cemented lens of a positive lens and a negative lens.

19. The zoom lens according to claim 1, wherein the fourth lens group includes a cemented lens of a positive lens and a negative lens, in order from the object.

20. The zoom lens according to claim 1, wherein the third lens group includes at least one aspherical lens.

21. An optical apparatus comprising the zoom lens according to claim 1.

22. A method for manufacturing a zoom lens, comprising:
disposing, in order from an object, a first lens group having positive refractive power; a second lens group having negative refractive power; a third lens group having positive refractive power; and a fourth lens group having positive refractive power,
with the following conditional expression being satisfied:

$$1.90<(-f2)/fw<3.00$$

where f2 denotes a focal length of the second lens group, and
fw denotes a focal length of the zoom lens in a wide-angle end state, and
the following conditional expression being satisfied:

$$0.005<(-f2)/ft<0.048$$

where ft denotes a focal length of the zoom lens in a Telephoto end state.

23. The method for manufacturing a zoom lens according to claim 22, wherein the following conditional expression is satisfied:

$$70.00<vdp1$$

where vdp1 denotes an Abbe number of a closest positive lens of the first lens group to an image plane.

24. The method for manufacturing a zoom lens according to claim 22, wherein the following conditional expression is satisfied:

$$0.05<f1/ft<0.50$$

where f1 denotes a focal length of the first lens group, and ft denotes a focal length of the zoom lens in a telephoto end state.

25. A zoom lens comprising, in order from an object:
a first lens group having positive refractive power;
a second lens group having negative refractive power;
a third lens group having positive refractive power; and
a fourth lens group having positive refractive power,
the following conditional expression being satisfied:

$$1.90<(-f2)/fw<3.00$$

where f2 denotes a focal length of the second lens group, and
fw denotes a focal length of the zoom lens in a wide-angle end state, and
the following conditional expression being satisfied:

$$0.05<f1/ft<0.50$$

where f1 denotes a focal length of the first lens group, and
ft denotes a focal length of the zoom lens in the telephoto end state.

26. A zoom lens comprising, in order from an object:
a first lens group having positive refractive power;
a second lens group having negative refractive power;
a third lens group including at least one aspherical lens and having positive refractive power; and
a fourth lens group having positive refractive power,
the following conditional expression being satisfied:

$$1.90<(-f2)/fw<3.00$$

where f2 denotes a focal length of the second lens group, and
fw denotes a focal length of the zoom lens in a wide-angle end state.

27. A method for manufacturing a zoom lens, comprising:
disposing, in order from an object, a first lens group having positive refractive power; a second lens group having negative refractive power; a third lens group having positive refractive power; and a fourth lens group having positive refractive power,
with the following conditional expression being satisfied:

$$1.90<(-f2)/fw<3.00$$

where f2 denotes a focal length of the second lens group, and
fw denotes a focal length of the zoom lens in a wide-angle end state, and
with the following conditional expression being satisfied:

$$0.05<f1/ft<0.50$$

where f1 denotes a focal length of the first lens group, and
ft denotes a focal length of the zoom lens in a telephoto end state.

28. A method for manufacturing a zoom lens, comprising:
disposing, in order from an object, a first lens group having positive refractive power; a second lens group having negative refractive power; a third lens group including at least one aspherical lens and having positive refractive power; and a fourth lens group having positive refractive power,
with the following conditional expression being satisfied:

$$1.90<(-f2)/fw<3.00$$

where f2 denotes a focal length of the second lens group, and
fw denotes a focal length of the zoom lens in a wide-angle end state.

* * * * *